(12) United States Patent
Silver et al.

(10) Patent No.: US 9,963,790 B2
(45) Date of Patent: May 8, 2018

(54) BIO-ELECTROCHEMICAL SYSTEMS

(76) Inventors: Matthew Silver, Cambridge, MA (US);
Justin Buck, Cambridge, MA (US);
Patrick Kiely, Gatineau (CA); Juan J. Guzman, Ithaca, NY (US)

( * ) Notice: Subject to any disclaimer, the term of this patent is extended or adjusted under 35 U.S.C. 154(b) by 772 days.

(21) Appl. No.: 13/880,401

(22) PCT Filed: Oct. 19, 2011

(86) PCT No.: PCT/US2011/056920
§ 371 (c)(1),
(2), (4) Date: Dec. 2, 2013

(87) PCT Pub. No.: WO2012/054629
PCT Pub. Date: Apr. 26, 2012

(65) Prior Publication Data
US 2014/0069806 A1    Mar. 13, 2014

Related U.S. Application Data

(60) Provisional application No. 61/468,865, filed on Mar. 29, 2011, provisional application No. 61/428,415, (Continued)

(51) Int. Cl.
*C25B 1/00* (2006.01)
*C25B 1/02* (2006.01)
(Continued)

(52) U.S. Cl.
CPC ............ *C25B 1/02* (2013.01); *C02F 3/005* (2013.01); *C02F 3/006* (2013.01); *C02F 3/301* (2013.01);
(Continued)

(58) Field of Classification Search
CPC ..... C25B 1/02; C25B 1/00; C25B 3/00; C02F 3/005; C02F 3/006; C02F 3/301;
(Continued)

(56) References Cited

U.S. PATENT DOCUMENTS 4,090,940 A    5/1978  Switzgable
4,388,162 A *  6/1983  Sammells .............. C25B 1/10
                                                    204/260
(Continued)

FOREIGN PATENT DOCUMENTS

CA        2247135        8/2006
CN     101849180 A       9/2010
(Continued)

OTHER PUBLICATIONS

Arnold, et al., "Regulation of Dissimilatory Fe(III) Reduction Activity in Shewanella putrefaciens," App and Env Microbiol, vol. 56, No. 9, pp. 2811-2817 (Sep. 1990).
(Continued)

*Primary Examiner* — Ciel P Thomas
(74) *Attorney, Agent, or Firm* — Capitol Patent & Trademark Law

(57) ABSTRACT

The present invention provides bio-electrochemical systems having various configurations for the treatment of water, wastewater, gases, and other biodegradable matter. In one aspect, the invention provides bio-electrochemical systems configured for treating wastewater while generating multiple outputs. In another aspect, the invention provides bio-electrochemical systems configured for improving the efficiency of electrodialysis removal systems. In yet another aspect, the invention provides bio-electro-chemical systems configured for use in banks and basins.

16 Claims, 23 Drawing Sheets

Related U.S. Application Data filed on Dec. 30, 2010, provisional application No. 61/394,576, filed on Oct. 19, 2010.

(51) Int. Cl.

| | |
|---|---|
| *C25B 3/00* | (2006.01) |
| *H01M 8/16* | (2006.01) |
| *C02F 1/469* | (2006.01) |
| *C02F 3/00* | (2006.01) |
| *C02F 3/30* | (2006.01) |
| *C02F 3/34* | (2006.01) |
| *C02F 103/00* | (2006.01) |

(52) U.S. Cl.
CPC .............. *C02F 3/34* (2013.01); *C25B 1/00* (2013.01); *C25B 3/00* (2013.01); *H01M 8/16* (2013.01); *C02F 1/4693* (2013.01); *C02F 2103/002* (2013.01); *C02F 2103/005* (2013.01); *C02F 2201/46115* (2013.01); *C02F 2201/46125* (2013.01); *C02F 2201/46145* (2013.01); *C02F 2201/46165* (2013.01); *C02F 2203/008* (2013.01); *C02F 2209/001* (2013.01); *C02F 2209/003* (2013.01); *C02F 2209/006* (2013.01); *C02F 2209/03* (2013.01); *C02F 2209/38* (2013.01); *C02F 2209/40* (2013.01); *C02F 2209/42* (2013.01); *Y02E 50/343* (2013.01); *Y02E 60/527* (2013.01); *Y02W 10/37* (2015.05)

(58) Field of Classification Search
CPC .............. C02F 3/34; C02F 2103/002; C02F 2103/005; C02F 2201/46115; C02F 2201/46125; C02F 2201/46145; C02F 2201/46165; C02F 2203/008; C02F 2209/001; C02F 2209/003; C02F 2209/006; C02F 2209/03; C02F 2209/38; C02F 2209/40; C02F 2209/42; H01M 8/16; Y02E 50/343; Y02E 60/527; Y02W 10/37

See application file for complete search history.

(56) References Cited

U.S. PATENT DOCUMENTS

| | | | |
|---|---|---|---|
| 8,440,438 B2 | 5/2013 | Cheng et al. | |
| 2001/0003276 A1 | 6/2001 | De Souza et al. | |
| 2002/0134674 A1 | 9/2002 | Andrews et al. | |
| 2002/0148722 A1 | 10/2002 | Hermann et al. | |
| 2003/0226766 A1 | 12/2003 | Orlebeke | |
| 2004/0045885 A1 | 3/2004 | Naoki et al. | |
| 2005/0164331 A1 | 7/2005 | Kim et al. | |
| 2005/0183964 A1 | 8/2005 | Roberts et al. | |
| 2005/0255345 A1 | 11/2005 | Gerritse et al. | |
| 2006/0011491 A1* | 1/2006 | Logan | C02F 3/005 205/637 |
| 2007/0017877 A1 | 1/2007 | Andes | |
| 2007/0048577 A1 | 3/2007 | Ringeisen et al. | |
| 2007/0259217 A1* | 11/2007 | Logan | H01M 4/90 429/2 |
| 2008/0277273 A1 | 11/2008 | Logan | |
| 2008/0292912 A1 | 11/2008 | Logan et al. | |
| 2009/0130734 A1 | 5/2009 | Mets | |
| 2009/0142627 A1 | 6/2009 | Shimomura et al. | |
| 2009/0166208 A1 | 7/2009 | Dong | |
| 2009/0274353 A1 | 12/2009 | Massie | |
| 2009/0317882 A1 | 12/2009 | Cheng | |
| 2010/0051542 A1 | 3/2010 | Elektorowicz | |
| 2010/0155258 A1* | 6/2010 | Kirk | B01D 53/326 205/351 |
| 2010/0270158 A1 | 10/2010 | Logan | |
| 2011/0165667 A1 | 7/2011 | Mets | |
| 2011/0183159 A1* | 7/2011 | He | C02F 3/341 429/2 |
| 2012/0132521 A1 | 5/2012 | Silver et al. | |

FOREIGN PATENT DOCUMENTS

| | | |
|---|---|---|
| EP | 573226 A1 | 12/1993 |
| EP | 1364914 A1 | 11/2003 |
| JP | 08138978 A | 5/1996 |
| JP | H09-155388 | 6/1997 |
| JP | H10-230293 A | 9/1998 |
| JP | 11-010184 H | 1/1999 |
| JP | H11047793 | 2/1999 |
| JP | H11-216496 A | 8/1999 |
| JP | H11-253993 A | 9/1999 |
| JP | 2000-051894 A | 2/2000 |
| JP | 2000-157995 A | 6/2000 |
| JP | 2001-145896 A | 5/2001 |
| JP | 2002-086189 A | 3/2002 |
| JP | 2002520032 A | 7/2002 |
| JP | 2003071453 | 3/2003 |
| JP | 2004342412 | 12/2004 |
| JP | 2005-125172 A | 5/2005 |
| JP | 2005256155 | 9/2005 |
| JP | 2006-35158 | 2/2006 |
| JP | 2006159112 | 6/2006 |
| JP | 2007090232 | 4/2007 |
| JP | 2007-117995 A | 5/2007 |
| JP | 2007-227216 A | 9/2007 |
| JP | 2008-114191 A | 5/2008 |
| JP | 2010537822 | 12/2010 |
| KR | 100810718 B1 | 3/2008 |
| WO | WO-0003447 A1 | 1/2000 |
| WO | WO-2001004061 A1 | 1/2001 |
| WO | WO-2004004036 A2 | 1/2004 |
| WO | WO-2008059331 A2 | 5/2008 |
| WO | WO-2008109911 A1 | 9/2008 |
| WO | WO-2008109962 A1 | 9/2008 |
| WO | WO-2009042631 A2 | 4/2009 |
| WO | WO-2009072887 A1 | 6/2009 |
| WO | WO-2009046417 A1 | 9/2009 |
| WO | WO-2009131452 A1 | 10/2009 |
| WO | WO-2009140428 A1 | 11/2009 |
| WO | WO-2009155587 A2 | 12/2009 |
| WO | WO-2010044983 A2 | 4/2010 |
| WO | WO-2010147683 A1 | 12/2010 |
| WO | WO-201100008 A1 | 1/2011 |
| WO | WO-2011003081 A1 | 1/2011 |
| WO | WO-2012011984 A1 | 1/2012 |

OTHER PUBLICATIONS

Beliaev, et al., "Global transcriptome analysis of Shewanella oneidensis MR-1 exposed to different terminal electron acceptors," J Bacteriol, vol. 187, No. 20, pp. 7138-7145 (Oct. 2005).

Bendikov, et al., "Development and Environmental Application of a Nitrate Selective Microsensor Based on Doped Polypyrrole Films," Sensors and Actuators B, vol. 106, No. 2 (May 13, 2005), 7 pages.

Bergel, et al., "Catalysis of Oxygen Reduction in PEM Fuel Cell by Seawater Biofilm." Electrochem. Commun., vol. 7(9), pp. 900-904 (2005).

Biffinger, et al., "A Biofilm Enhanced Miniature Microbial Fuel Cell Using Shewanella Oneidensis DSP10 and Oxygen Reduction Cathodes," Biosensors and Bioelectronics, vol. 22, pp. 1672-1679 (2007).

Bourgeois, et al., "On-Line Monitoring of Wastewater Quality: A Review," Journal of Chemical Technology & Biotechnology, vol. 76, pp. 337-348 (2001).

Bretschger, et al., "Current Production and Metal Oxide Reduction by Shewanella oneidensis MR-1 Wild Type and Mutants," App and Env. Microbiol., vol. 73, No. 21, pp. 7003-7012 (2007), including "Erratum," App and Env. Microbiol., vol. 74, No. 2, pp. 553 (2008); 11 pages.

(56) References Cited

OTHER PUBLICATIONS

Call, D. and Logan, B. E., "Hydrogen production in a single chamber microbial electrolysis cell lacking a membrane," Environ. Sci. Technol., vol. 42, pp. 3401-3406 (2008).
Chang, I. et al., "Improvement of a microbial fuel cell performance as a BOD sensor using respiratory inhibitors," Biosensors and Bioelectronics, vol. 20, pp. 1856-1859 (2005).
Chang, I. et al , "Continuous determination of biochemical oxygen demand using microbial fuel cell type biosensor," Biosensors and Bioelectronics, vol. 19, pp. 607-613 (2004).
Cheng, et al., "Direct Biological Conversion of Electrical Current into Methane by Electromethanogenesis," Environmental Science and Technology, American Chemical Society, vol. 43, No. 10, pp. 3953-3958 (Mar. 26, 2009).
Cheng, et al., "Increased Performance of Single-Chamber Microbial Fuel Cells Using an Improved Cathode Structure," Electrochemistry Communications, vol. 8, No. 3, pp. 489-94 (Mar. 2006).
Cheng, S. and Logan, B. E., "Sustainable and Efficient Biohydrogen Production via Electrohydrogenesis," PNAS, vol. 104, No. 47, pp. 18871-18873 (2007).
Clauwaert, et al., "Open Air Biocathode Enables Effective Electricity Generation with Microbial Fuel Cells," Environmental Science & Technology, vol. 41, No. 21, pp. 7564-7569 (Nov. 2007).
Cruz-Garcia, et al., "Respiratory nitrate ammonification by Shewanella oneidensis MR-1," J Bacteriol, vol. 189, No. 2, pp. 656-662 (Jan. 2007).
David, et al., "Nitrogen balance in and export from an agricultural watershed," J Environ Qual., vol. 26, pp. 1038-1048 (1997).
Dichristina, T.J., "Effects of Nitrate and Nitrite on Dissimilatory Iron Reduction by Shewanella putrefaciens 200," J Bacteriol, vol. 174, No. 6, pp. 1891-1896 (1992).
Dinnes, et al., "Nitrogen Management Strategies to Reduce Nitrate Leaching in Tile-Drained Midwestern Soils," Agronomy Journal, vol. 94, pp. 153-171 (2002).
Extended European Search Report issued by the European Patent Office for European Application No. 10789884.3 dated May 16, 2013 (10 pgs.).
Faeth, P., "Fertile Ground: Nutrient Trading's Potential to Cost-Effectively Improve Water Quality," Washington, DC: World Resources Institute, 59 pgs. (2000).
Freguia, et al., "Electron and Carbon Balances in Microbial Fuel Cells Reveal Temporary Bacterial Storage Behavior During Electricity Generation," Environmental Science & Technology, vol. 41, No. 8, pp. 2915-2921 (Apr. 2007).
Gieling, et al., "ISE and Chemfet sensors in greenhouse cultivation," Sensors and Actuators B, vol. 105, pp. 74-80 (2005).
Gorby, et al., "Electrically conductive bacterial nanowires produced by Shewanella oneidensis strain MR-1 and other microorganisms." Proceedings of the National Academy of Sciences, vol. 103, No. 30, pp. 11358-11363 (2006).
Grommen, et al., "Removal of Nitrate in Aquaria by Means of Electrochemically Generated Hydrogen Gas as Electron Donor for Biological Denitrification," Aquacultural Engineering, vol. 34, No. 1, pp. 33-39 (2006).
Hallenbeck, P.C. and Benemann, J.R., "Biological hydrogen production; fundamentals and limiting processes." Int. J. Hydrogen Energy, vol. 27, pp. 1185-1193 (2002).
He, et al., "Electricity Generation from Artificial Wastewater Using an Upflow Microbial Fuel Cell," Environmental Science & Technology, vol. 39, No. 14, pp. 5262-5267 (Jul. 2005).
He, Zhen, and Angenent, L.T., "Application of Bacterial Biocathodes in Microbial Fuel Cells," Electroanalysis, vol. 18, No. 19-20, pp. 2009-2015 (Oct. 2006).
Holmes, et al., "Potential Role of a Novel Psychrotolerant Member of the Family Geobacteraceae, Geopsychrobacter electrodiphilus gen. nov., sp. nov., in Electricity Production by a Marine Sediment Fuel Cell," Applied and Environmental Microbiology, vol. 70, No. 10, pp. 6023-6030 (2004).
International Search Report and Written Opinion issued by the Korean Intellectual Property Office as International Searching Authority for for International Application No. PCT/US2010/059554 dated Sep. 26, 2011 (8 pgs.).
International Search Report and Written Opinion issued by the Korean Intellectual Property Office as International Searching Authority for International Application No. PCT/US2011/056920 dated May 31, 2012 (10 pgs.).
International Search Report and Written Opinion issued by the Korean Intellectual Property Office as International Searching Authority for International Application No. PCT/US2010/025224 dated Oct. 12, 2010 (9 pgs.).
International Search Report and Written Opinion issued by the Korean Intellectual Property Office as International Searching Authority for International Application No. PCT/US2011/032500 dated Dec. 27, 2011 (11 pgs.).
International Search Report and Written Opinion issued by the Korean Intellectual Property Office as International Searching Authority for International Application No. PCT/US2011/044872 dated Mar. 15, 2012 (12 pgs.).
Jia, et al., "Simultaneous Organics Removal and Bio-Electrochemical Denitrification in Microbial Fuel Cells," Bioprocess and Biosystems Engineering, vol. 31, No. 4, pp. 315-321 (2008).
Kang, et al., "A microbial fuel cell with improved cathode reaction as a low biochemical oxygen demand sensor," Biotechnology Letters, vol. 25, pp. 1357-1361 (2003).
Kim, et al., "Novel BOD (biological oxygen demand) sensor using mediator-less microbial fuel cell," Biotechnology Letters, vol. 25, pp. 541-545 (2003).
Kim, et al., "Membrane-electrode assembly enhances performance of a microbial fuel cell type biological oxygen demand sensor," Environmental Technology, vol. 30, No. 4, pp. 329-336 (Apr. 1, 2009).
Kim, H., et al., "A Microbial Fuel Cell Type Lactate Biosensor Using a Metal-Reducing Bacterium, Shewanella putrefaciens," J. Microbiol. Biotechnol., vol. 9, No. 3, pp. 365-367 (1999).
Kostka, J.E. and Nealson, K.H., "Dissolution and reduction of magnetite by bacteria," Environmental Science and Technology, vol. 29, pp. 2535-2540 (1995).
Kreysa, et al., "Bioelectrochemical Hydrogen Production," International Journal of Hydrogen Energy, vol. 19, No. 18, pp. 673-676 (Aug. 1, 1994).
Kumlanghan, et al., "Microbial fuel cell-based biosensor for fast analysis of biodegradable organic matter," Biosensors and Bioelectronics, vol. 22, pp. 2939-2944 (2007).
Kuroda, et al., "CO2 Reduction to Methane and Acetate Using a Bio-Electro Reactor with Immobilized Methanogens and Homoacetogens on Electrodes," Energy Convers. Mgmt, vol. 36, No. 6-9, pp. 787-790 (1995).
Lee, et al., "Fate of H2 in an Upflow Single-Chamber Microbial Electrolysis Cell Using a Metal-Catalyst-Free Cathode," Environmental Science & Technology, vol. 43, No. 20, pp. 7971-7976 (Oct. 15, 2009).
Liu, et al., "Immobilised Activated Sludge Based Biosensor for Biochemical Oxygen Demand Measurement," Biosensors and Bioelectronics, vol. 14, No. 12, pp. 883-893 (2000).
Liu, et al., "Power Generation in Fed-Batch Microbial Fuel Cells as a Function of Ionic Strength, Temperature, and Reactor Configuration," Environ. Sci. Technol., vol. 39, No. 14, pp. 5488-5493 (2005).
Liu, et al., "Production of Electricity during Wastewater Treatment Using a Single Chamber Microbial Fuel Cell." Environmental Science & Technology, vol. 38, No. 7, pp. 2281-2285 (2004).
Liu, J. And Mattiasson, B., "Microbial BOD Sensors for Wastewater Analysis," Water Research, vol. 36, No. 15, pp. 3786-3802 (2002).
Logan, Bruce E, and Regan, John M., "Microbial Fuel Cells: Challenges and Applications." Environmental Science & Technology, vol. 40, No. 17, pp. 5172-5180 (Sep. 1, 2006).
Logan, et al., "Electricity generation from cysteine in a microbial fuel cell," Water Res., vol. 39, pp. 942-952 (2005).
Logan, et al., "Graphite Fiber Brush Anodes for Increased Power Production in Air-Cathode Microbial Fuel Cells," Environmental Science & Technology, vol. 41, No. 9, pp. 3341-3346 (May 2007).

(56) References Cited

OTHER PUBLICATIONS

Logan, et al., "Microbial Electrolysis Cells for High Yield Hydrogen Gas Production from Organic Matter," Environmental Science & Technology, vol. 42, No. 23, pp. 8630-8640 (Dec. 2008).

Logan, et al., "Microbial Fuel Cells: Methodology and Technology," Environmental Science & Technology, vol. 40, No. 17, pp. 5181-5192 (2006).

Min, et al., "Electricity Generation from Swine Wastewater Using Microbial Fuel Cells," Water Research, vol. 39, No. 20, pp. 4961-4968 (Dec. 2005).

Niessen, et al., "Gaining Electricity from in Situ Oxidation of Hydrogen Produced by Fermentative Cellulose Degradation," Letters in Applied Microbiology, vol. 41, No. 3, pp. 286-290 (Sep. 2005).

Office Action issued by the Japan Patent Office for Japan Patent Application No. 2014-184927 dated Sep. 15, 2015 (8 total pages).

Oh, S., and Logan, B. E., "Hydrogen and Electricity Production from a Food Processing Wastewater Using Fermentation and Microbial Fuel Cell Technologies," Water Research, vol. 39, pp. 4673-4682 (2005).

Pham, et al., "Microbial Fuel Cells in Relation to Conventional Anaerobic Digestion Technology," Engineering in Life Sciences, vol. 6, No. 3, pp. 285-292 (2006).

Rabaey, et al., "Biofuel Cells Select for Microbial Consortia That Self-Mediate Electron Transfer," Applied and Environmental Microbiology, vol. 70, No. 9, pp. 5373-5382 (Sep. 2004).

Rabaey, et al., "Tubular Microbial Fuel Cells for Efficient Electricity Generation," Environmental Science and Technology, vol. 39, No. 20, pp. 8077-8082 (2005).

Rabaey, et al., "Cathodic Oxygen Reduction Catalyzed by Bacteria in Microbial Fuel Cells," The ISME Journal, vol. 2, No. 5, pp. 1-9 (Feb. 2008).

Rabaey, K. and Verstraete, W., "Microbial Fuel Cells: Novel Biotechnology for Energy Generation," Trends in Biotechnology, vol. 23, No. 6, pp. 291-298 (2005).

Ratako, et al., "Micro- and Mini-Nitrate Sensors for Monitoring of Soils, Groundwater and Aquatic Systems," Center for Embedded Network Sensing, 3 pgs. (May 12, 2009).

Rezaei, et al., "Substrate-enhanced microbial fuel cells for improved remote power generation from sediment-based systems," Environ Sci. Technol., vol. 41, pp. 4053-4058 (2007).

Ringeisen, et al., "High Power Density from a Miniature Microbial Fuel Cell Using Shewanella oneidensis DSP10," Environ. Sci. Technol., vol. 40, pp. 2629-2634 (2006).

Rozendal, et al., "Principle and Perspectives of Hydrogen Production through Biocatalyzed Electrolysis," International Journal of Hydrogen Energy, vol. 31, No. 12, pp. 1632-1640 (Sep. 2006).

Selembo, et al., "The Use of Stainless Steel and Nickel Alloys as Low-Cost Cathodes in Microbial Electrolysis Cells," Journal of Power Sources, vol. 190, No. 2, pp. 271-278 (May 2009).

Shantaram, et al., "Wireless sensors powered by microbial fuel cells," Environ Sci Technol, vol. 39, pp. 5037-5042 (2005).

Sukkasem, et al., "Effect of Nitrate on the Performance of Single Chamber Air Cathode Microbial Fuel Cells," Water Research, vol. 42, No. 19, pp. 4743-4750 (Dec. 2008).

Tabacova, et al., "Exposure to Oxidized Nitrogen: Lipid Peroxidation and Neonatal Health Risk," Archives of Environmental Health: An International Journal, vol. 53, No. 3 (1998), 9 pages.

Tabacova, et al., "Maternal Exposure to Exogenous Nitrogen Compounds and Complications of Pregnancy," Archives of Environmental Health: An International Journal, vol. 52, No. 5, (1997), 8 pages.

Van Ginkel, et al., "Biohydrogen gas production from food processing and domestic wastewaters," Int. J. Hydrogen Energy, vol. 30, pp. 1535-1542 (2005).

Wang, et al., "Accelerated Start-up of Two-Chambered Microbial Fuel Cells: Effect of Anodic Positive Poised Potential," Electrochimica Acta, vol. 54, pp. 1109-1114 (2009).

European Examination Report for European Patent Application No. 11809996.9 dated Sep. 13, 2016 consisting of 4 pages.

\* cited by examiner

Platinum Coated
Membrane Electrode
Assembly

FIGURE 5

| Electrode | Function | Operating Characteristic | Voltages Applied? | Benefits |
|---|---|---|---|---|
| Anode | BOD Oxidation | Aqueous Bio-Anode | NA | Reduce load on multi-filtration beds |
| Cathode (1) | Power/Water Production | Platinum Oxygen-Cathode | NO - Generates Electricity | Water recovery; power |
| Cathode (2) | Hydrogen Production | Platinum Nitrogen Cathode | Yes ~ 0.2 – 0.8 V | Faster treatment; $H_2$ can be used in Sabatier process for water recovery |
| Cathode (3) | $CO_2$ Reduction/ Methane Production | Aqueous Bio-Cathode | Yes ~ 0.2 – 0.8 V | Faster treatment; $CO_2$ Reduction; Methane as fuel for long term exploration; pH adjustment in EWR System |

D)

BIO-ELECTROCHEMICAL SYSTEMS

REFERENCE TO RELATED APPLICATIONS

This application is a national-stage entry of International Patent Application No. PCT/US2011/056920, filed 19 Oct. 2011, which application claims priority to U.S. Provisional Application No. 61/394,576, filed Oct. 19, 2010, U.S. Provisional Application No. 61/428,415, filed Dec. 30, 2010 and U.S. Provisional Application No. 61/468,865, filed Mar. 29, 2011. The contents of each of these applications are herein incorporated by reference in their entireties.

STATEMENT OF GOVERNMENT INTEREST

This invention was made with Government support under Contract 1152409 awarded by the National Science Foundation. The U.S. Government has certain rights in this invention.

TECHNICAL FIELD

The invention relates to methods and devices for bio-electrochemical systems which can be used for the treatment of water, wastewater, gases, and other biodegradable matter and the generation of multiple value added products from such matter.

BACKGROUND OF THE INVENTION

The treatment of water is an issue whose impact is difficult to overstate. It impacts society as a whole through our collective need to counteract the pollution contained in wastewater and through the growing need for potable water in both industrialized and rapidly industrializing societies. Moreover, water treatment is a crucial consideration for such diverse arms of the government as NASA, which relies on the ability to recycle water in a closed loop in order to engage in even minimal space exploration, and the military, which requires simple and robust methods for providing clean water to service members deployed in regions which have underdeveloped or vulnerable water infrastructure.

A second critical, and related issue is the generation of energy. Wastewater treatment infrastructure has historically consumed approximately three percent (3%) of all electricity produced in the United States. Of the electricity produced, approximately one and one-half percent (1.5%) is used in the actual treatment of wastewater. This weakness in current wastewater treatment infrastructure is compounded in contexts where energy from outside of the water treatment facilities is hard to come by or is unreliable—such as undeveloped or underdeveloped regions of the world, in remote terrestrial environments, or in space. In such contexts, water treatment diverts energy needed elsewhere, while failures in energy provision can sabotage water treatment.

The three different commercial methods by which electricity and selective membranes are combined to remove impurities from water include; Electrodialysis (ED), Electrodialysis Reversal (EDR) and Electrodeionization (EDI). For the removal of nitrates from waste streams the process of EDR is typically used. These systems have been shown to remove nitrate from drinking water and brewery waste water. This process has the advantages of removing a range of ionic substances from water including; radium, arsenic, perchlorate, fluoride, nitrate, uranium and selenium. GE systems currently on the market have the ability to remove 40-90% of total dissolved solids and achieve up to 94% water recovery. Although EDR technology has distinct advantages over alternate technologies for the removal of ions and charged species from water sources, certain inescapable disadvantages also exist. The primary disadvantages with this technology is that it is relatively energy intensive and contaminants are not actually treated in the process but are instead concentrated into a brine stream. This brine can contain nitrate concentrations ranging from 250-2491 mg/l which invariably require down-stream treatment. This brine taken from the system is either pumped back into municipal water courses or is biologically treated on site.

Bio-electrochemical systems (BESs) are a class of technologies capable of treating water while generating electricity or other value-added products such as methane and hydrogen. Based on the ability of newly discovered microbes (termed "electricigens") to interact electrically through direct contact with electrodes, BESs can be configured into fuel cells with living, regenerative catalysts. Fuel can include a wide range of organic substrates found in wastewater including sugars and low weight organic molecules such as ethanol and acetic acid. Because they can remove biological oxygen demand (BOD) in wastewater while generating modest amounts of electricity BESs have the potential to greatly enhance the closure and energetics of water treatment systems. BESs have the potential to function in a wide variety of capacities, such as by dynamically generating multiple useful products and by improving the efficiency of electrodialysis removal systems.

SUMMARY OF THE INVENTION

It is an object of the present invention to develop a simple and robust system with the purpose of treating wastewater and/or biogases, by bio-electrochemically increasing treatment rates and simultaneously generating one or more value added products, thereby decreasing capital and operating expense.

It is the object of this invention to develop a system that utilizes electrogenic microbes to enhance the treatment of wastewater, gases and/or gas mixtures and which is capable of generating multiple outputs, including value added products such as electricity, hydrogen and methane.

For example, in one embodiment, the invention provides a bio-electrochemical cell comprising an aqueous compartment comprising at least one anode electrode and at least one cathode electrode, a gaseous compartment separate from the aqueous compartment and comprising at least one cathode electrode, and at least one electrogenic microbe disposed in the aqueous compartment. A selectively permeable barrier is optionally disposed between the aqueous and gaseous compartments.

In certain embodiments, the at least one electrogenic microbe is associated with at least one anode disposed in the aqueous chamber. In other embodiments, the at least one electrogenic microbe is associated with the cathode disposed in the aqueous chamber.

Preferably, the anode and cathode disposed in the aqueous chamber are electrically coupled to the cathode disposed in the aqueous chamber. The anode disposed in the aqueous chamber may also be electrically coupled to the cathode disposed in the gaseous chamber. In a particular embodiment, the anode disposed in the aqueous chamber is electrically coupled to both the cathode of the aqueous chamber and the cathode of the gaseous chamber.

The bio-electrochemical cell of the invention further includes a power source configured to apply a voltages to the various electrodes. For example, a voltage can be applied to the cathode located in the aqueous chamber, to the at least one anode located in the aqueous chamber, between the at least one anode and cathode of the aqueous chamber, and/or between the at least one anode of the aqueous chamber and cathode of the gaseous chamber, depending on the electrical coupling of the electrodes, as previously described.

In certain embodiments, the bio-electrochemical cell of the invention includes an aqueous compartment comprising two anodes, at least one of the anodes being electrically coupled to the cathode of the aqueous compartment, and at least one of the anodes being electrically coupled to the cathode of the gaseous compartment. In this embodiment, a power source can be configured to apply a voltage between the at least one anode and the cathode of the aqueous compartment, between the at least one anode and cathode of the gaseous compartment, or both.

In certain aspects of the invention, the electrodes of the aqueous and the gaseous compartments are configured to rotate around a central axis. In a particular embodiment, the bio-electrochemical cell is configured as a substantially circular cassette comprising an anode and two cathodes, each configured as circular discs. The aqueous compartment is defined by the two cathode electrodes and a reactor housing surrounding the space defined between the two cathodes, the anode being disposed between the two cathodes within the space defined by the cathodes and housing. In certain embodiments, the gaseous compartment is defined by a housing surrounding the circular cassette, such that each cassette has its own individually controlled cathode chamber (gaseous chamber). In an alternative embodiment, a plurality of the circular cassettes having exposed cathodes are disposed in a central housing, which serves as a central cathode chamber (gaseous chamber) for each of the plurality of cassettes.

One or more ports are fluidically coupled to the aqueous compartment for input/output of different fluids to be treated by the invention (e.g., wastewater, etc.). Likewise, one or more ports are fluidically coupled to the gaseous compartment for input/output of different gases. As such, a variety of fluids and/or gases can be input into the aqueous and gaseous chambers, depending on the desired output (e.g., hydrogen, methane, electricity, etc.).

In some aspects, the invention further provides a bio-electrochemical system comprising at least three distinct chambers fluidically coupled to one another, where one of the chambers is a bio-electrochemical cell capable of generating multiple outputs, including value added products such as electricity, hydrogen and methane, described above; a second chamber is configured for anaerobic digestion of wastewater, gases, or other biodegradable matter, and the third chamber is a holding tank for wastewater, gases, or other biodegradable matter.

It is the object of this invention to develop scalable architectures for electrogenic wastewater treatment.

It is the object of this invention to develop a system that utilizes electrogenic microbes to enhance electrodialysis for the purposes of simultaneously and separately treating grey and dark wastewater streams while producing valuable biogas for use in heating, in generators or in portable fuel cells.

For example, in certain aspects, the invention provides a bio-electrochemical system comprising at least three chambers arranged in a sequential manner, where each chamber is separated by at least one selectively permeable barrier. The first chamber comprises an anode and at least one electrogenic microbe. The second chamber is disposed between the first chamber and a third chamber and is configured for performing electrodialysis. The third chamber comprises a cathode. The anode in the first chamber and the cathode in the second chamber are electrically coupled. The bio-electrochemical system can further include a power source for applying a voltage between the anode and the cathode.

In certain embodiments, the third chamber is an aqueous container. Alternatively, the third chamber is a gaseous chamber.

In certain embodiments, the second (electrodialysis) chamber and the third (cathode) chamber are separated by a cation exchange membrane.

In certain embodiments, the first and second chamber may be separated by two selectively permeable membranes, the two membranes being spaced apart to form an intermembrane chamber disposed between the first and second chambers. In this embodiment, the first (anode) chamber is separated from the intermembrane chamber by a cation exchange membrane, and the inter-membrane chamber is separated from the second (electrodialysis) chamber by an anion exchange membrane.

These and other aspects of the invention will become more readily apparent in view of the description, drawings and claims that follow.

BRIEF DESCRIPTION OF THE DRAWINGS

FIG. 5 is a table summarizing the various functions, operating characteristics and likely benefits/costs of each electrode reaction in the multi-output systems provided by the present invention.

DETAILED DESCRIPTION

1 Bio-electrochemical Multi-Output Systems

In one aspect, the present invention provides novel, multi-output bio-electrochemical systems configured to generate more than one product/output at the cathodes, including water/electricity, hydrogen, or $CO_2$ reduction to water and methane, depending on the desired operation. The multi-output systems of the invention can be designed to switch between cathodic outputs based on day-to-day needs, while continuously treating BOD and TSS at a bio-anode at ambient temperature and pressure. Depending on the process design, BOD reduction at the anode will reduce the load on downstream wastewater processing. In space-based life-support related applications, for example, removing BOD at the start of a processing assembly can decrease mass-requirements for consumables such as filtration beds. Depending on the operation regime, output hydrogen might help bring stoichiometric parity within a hydrogen-limited Sabatier process.

Figure 1:
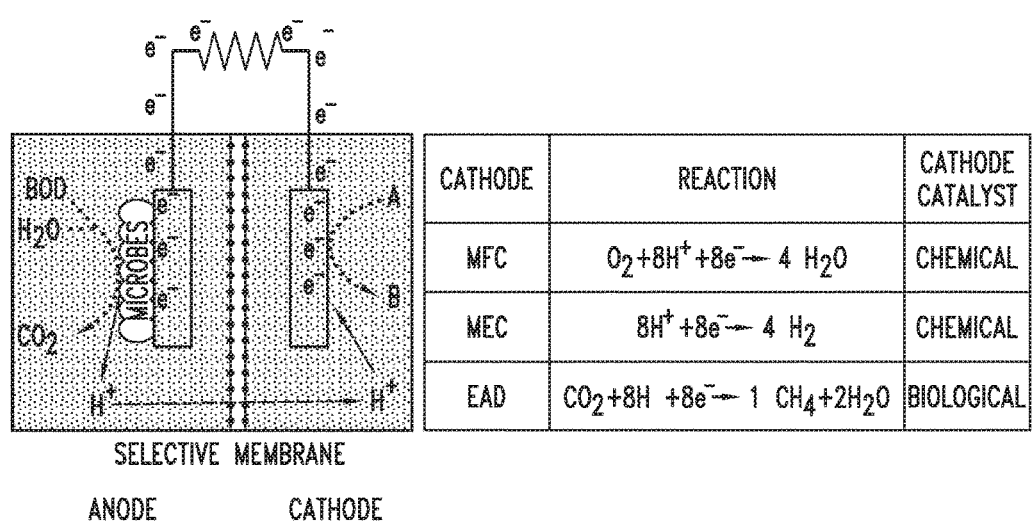
FIG. 1 is a general schematic depicting an embodiment of a bio-electrochemical system (BES).

In one embodiment, the present invention provides a bio-electrochemical system (BES) for the purpose of wastewater treatment comprised of a cell containing at least one anode and at least one cathode. A general, simplified schematic of a BES cell is depicted in FIG. 1.

The cell may be arranged in multiple configurations. In some embodiments the cell will have two or more anodes. In some embodiments, the cell will have two or more cathodes. In some embodiments the electrodes will be separated by selectively permeable membranes, including cation, anion, proton diffusion and oxygen diffusion membranes.

In some embodiments, an anode is populated with electrogenic microbes. In some embodiments the microbial community present on the anode oxidizes organic compounds.

In some embodiments at least one of the cathodes is exposed to a gas chamber. In certain embodiments, the anodic chamber and the cathodic gas chamber are separated by the cathode and a hydrophobic barrier is located on either the aqueous or the gas side of the cathode. In certain embodiments, different gases may be brought into the gas chamber in order to facilitate different kinds of cathodic reactions. For example, in some embodiments, oxygen or air may be added to the cathodic gas chamber. In other instances, nitrogen or hydrogen may be added to the gas chamber. In certain embodiments when oxygen is present the cell will generate electricity due to the voltage difference between the oxidation reactions at the anode and the reduction of oxygen to water at the cathode. In certain embodiments, a voltage might be applied between the anode and cathode in order to speed up oxidation rates and to generate different products at the cathode. In certain embodiments, a voltage may be applied such that the cathode potential is more negative than the anode potential. In certain embodiments, if the cathode gas chamber is filled with anaerobic gas, and a voltage is applied between the anode and cathode, hydrogen will be generated at the cathode.

In some embodiments, at least one cathode is located in an aqueous chamber. In certain embodiments a cathode is populated by electrogenic microbes. In certain embodiments voltage may be applied to the cathode located in an aqueous chamber, facilitating the growth of electromethanogenic organisms which can reduce carbon dioxide in the anode chamber to methane.

Figure 2:
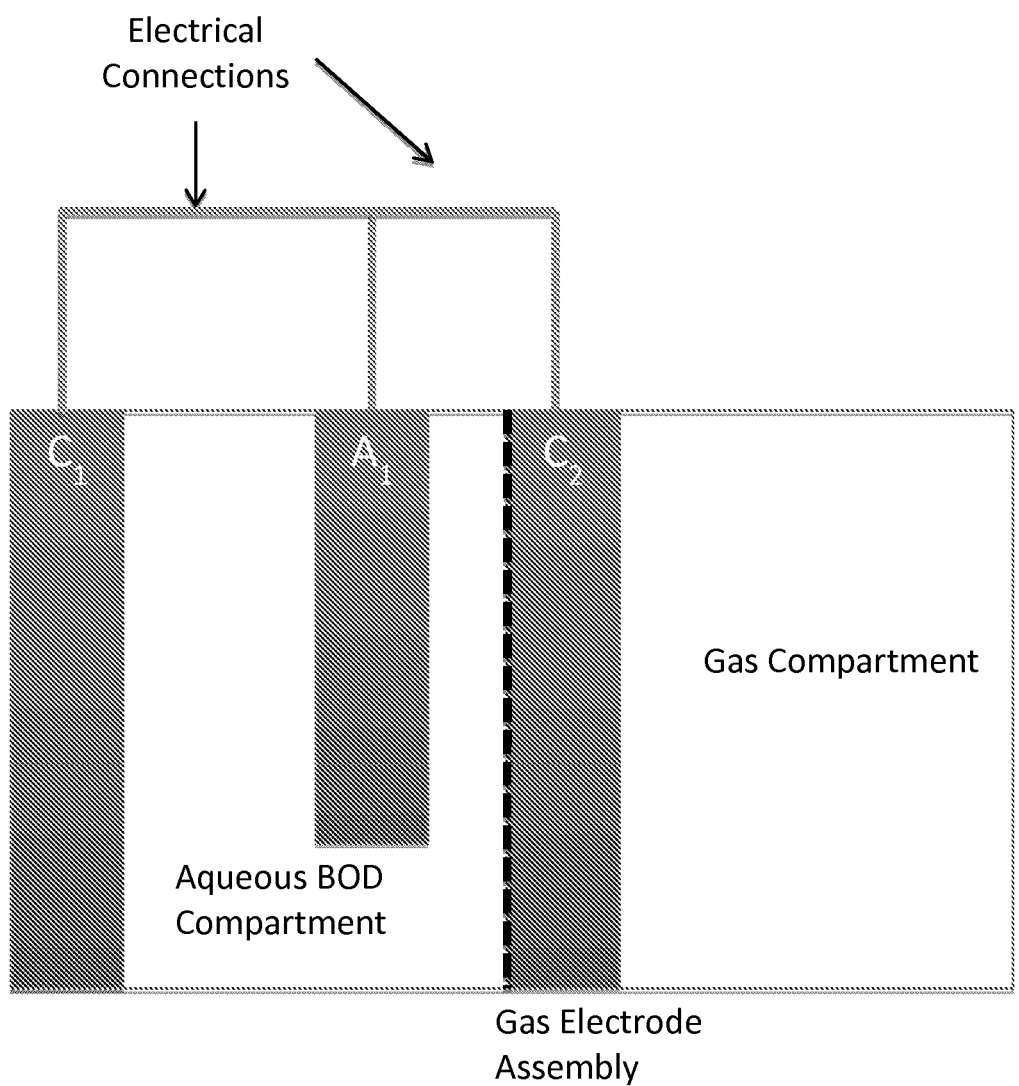
FIG. 2 is a schematic depicting an exemplary embodiment of a bio-electrochemical multi-output system according to the invention having a three-electrode setup.
Figure 3:
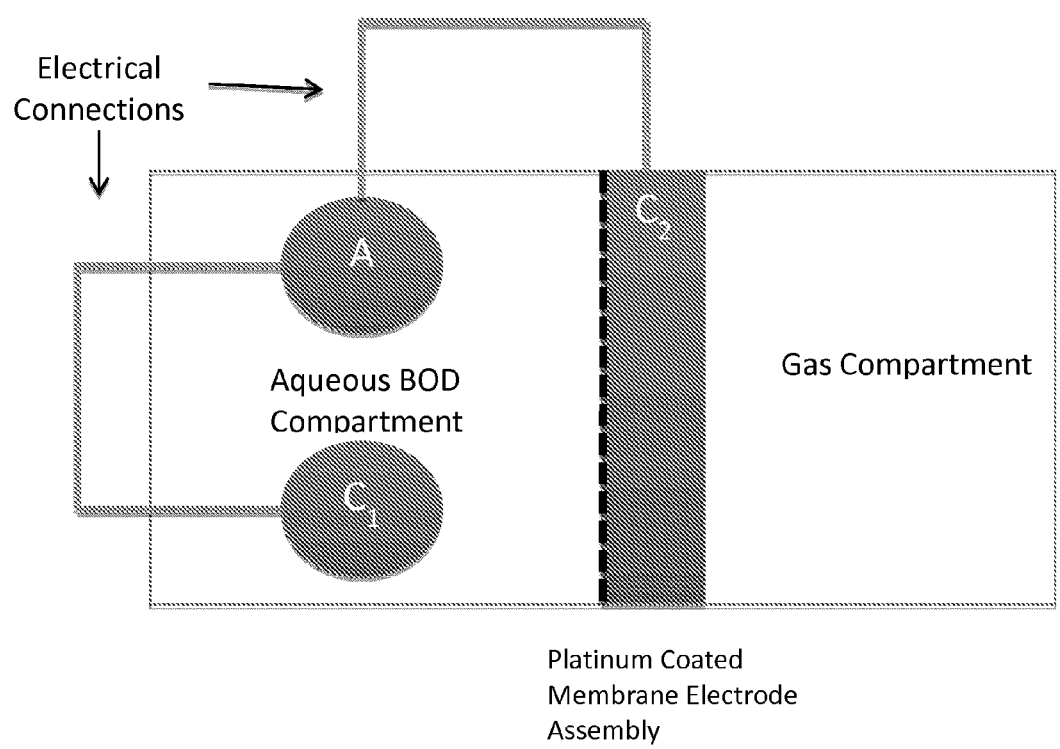
FIG. 3 is a schematic depicting an alternative exemplary embodiment of a bio-electrochemical multi-output system according to the invention having a three-electrode setup.

In the preferred embodiment, the cell will have three electrodes (FIGS. 2 and 3). In the proposed embodiment, there will be one anode and two cathodes. The anode will oxidize BOD. One cathode will be located in an aqueous chamber (FIG. 2). Voltage may be applied between the biological anode and aqueous biological cathode to generate methane. The second cathode will be exposed to a gas cathode (FIG. 2). The second cathode can function aerobically or anaerobically. When oxygen is present, the second cathode will catalyze the reduction of oxygen, leading to the product of water and electricity. When oxygen is removed and voltage applied between the anode and cathode (typically 0.8 Volts), the second cathode will generate hydrogen.

When the cell consists of three electrodes, the cell is capable of generating three products: Methane, Electricity, and Hydrogen. These different products can be generated concurrently or in series, depending on the control system. BOD is oxidized at the biological anode. One of the BES cathodes can be placed in the anodic chamber, becoming a bio-cathode. The other cathode can be separated from an anode chamber by a selective membrane. BOD is oxidized at the anode and electrons conducted to the electrodes by exo-electrogenic bacteria. At the cathodes, various reactions can complete the circuit. There are three operational modes depending on different cathodic reactions. If operated like a traditional fuel cell, a chemical air-cathode will reduce (i.e., consume) oxygen and hydrogen ions to generate water and generate electricity (see Reaction 1, FIG. 1). If the chemical cathode is anaerobic (e.g., nitrogen sparging or hydrogen sparging), and a small voltage is applied to the cell, hydrogen can be produced at the on the gas-side of the chemical cathode with the additional benefit of increased BOD oxidation at the anode relative to the increased current generated by the applied voltages (see Reaction 2, FIG. 1). The aqueous biological cathode can also be supplied with a voltage across the circuit, thereby reducing $CO_2$ to methane and water (see Reaction 3, FIG. 1).

Different kinds of circuits can be used to optimize treatment rates or products. For example, a control system can be designed that will switch the cathode gas, and/or change electrode potentials, depending on whether the system is to generate methane, hydrogen, electricity, or any combination thereof. In one embodiment, one or more aerobic gas cathode chambers will be used to generate electricity, and a control system will use this power to apply a voltage between the biotic anode and the biotic cathode. In this way, power produced by the cell is used to apply a voltage (typically 0.6-0.8 volts) between biotic anode and the aqueous biotic cathode, thereby generating methane via electromethanogenesis. The application of high voltages can also increase current and thereby augment treatment rates in the cell. In this embodiment the relative area of the three electrodes can be optimized so as to ensure maximum treatment rates and maximum methane, hydrogen and electricity production.

In related embodiments, the current will be run through either the gas cathode or the biotic cathode in such a way as to optimize parameters within the cell, such as pH, volatile fatty acids (VFA) concentration, or any other parameter of interest. Various electrical configurations between the biotic anode and cathode and gas cathode that may be utilized in the cells of the invention are depicted in FIGS. 2 and 3.

Figure 4:
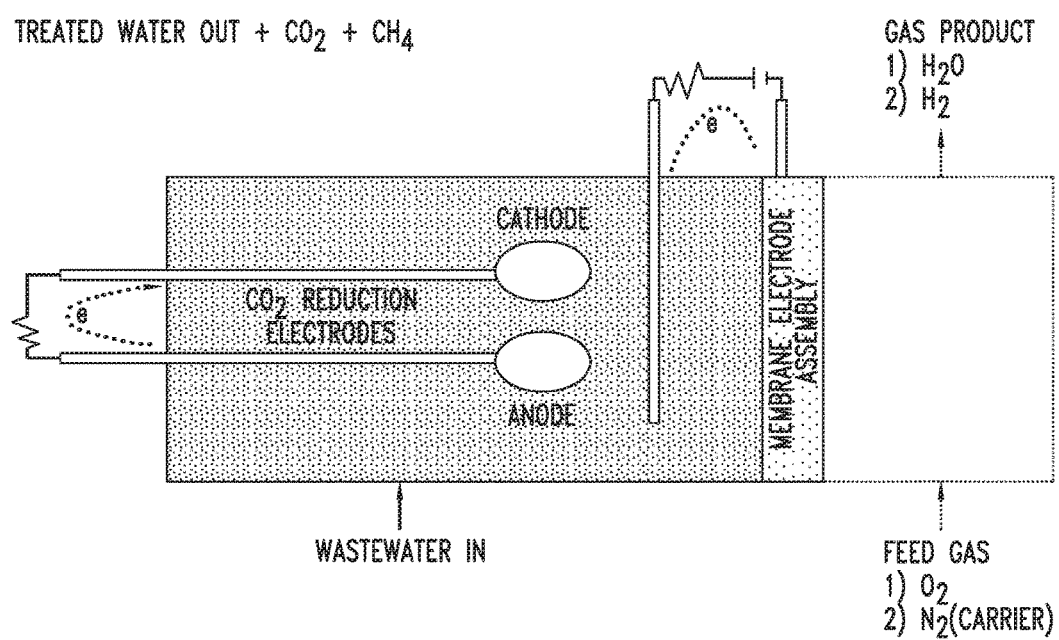
FIG. 4 is a schematic depicting an exemplary embodiment of a bio-electrochemical multi-output system according to the invention having a four-electrode setup.

In another embodiment, the cell may consist of four electrodes arranged in two cathode-anode pairs. Each anode would oxidize BOD (FIG. 4). One cathode would be located in an aqueous chamber and would perform methanogenesis. The other cathode would be located in a gas chamber and would produce electricity when oxygen was present or hydrogen when the oxygen is removed and voltage applied.

In some embodiments a cell will be singular. In some embodiments multiple cells may be arranged in series and in parallel.

The invention is not limited to any particular architecture and, consequently, can function in a variety of cell architectures.

A summary of the various functions, operating characteristics and likely benefits/costs of each electrode reaction in the multi-output systems provided by the present invention is shown in FIG. 5. In summary, depending on the cathodic reaction, the multi-output systems of the invention have the potential to reduce the need for expendable filtration beds, increase water recovery and/or potentially generate a small amount of power. Further, the possibility of switching operating modes in real time—or combining operating modes in one rack—can increase the flexibility and adaptability of the water recovery system.

1.1 Example 1: Three-Phase Separation in Microgravity—Embodiment 1

Figure 6:
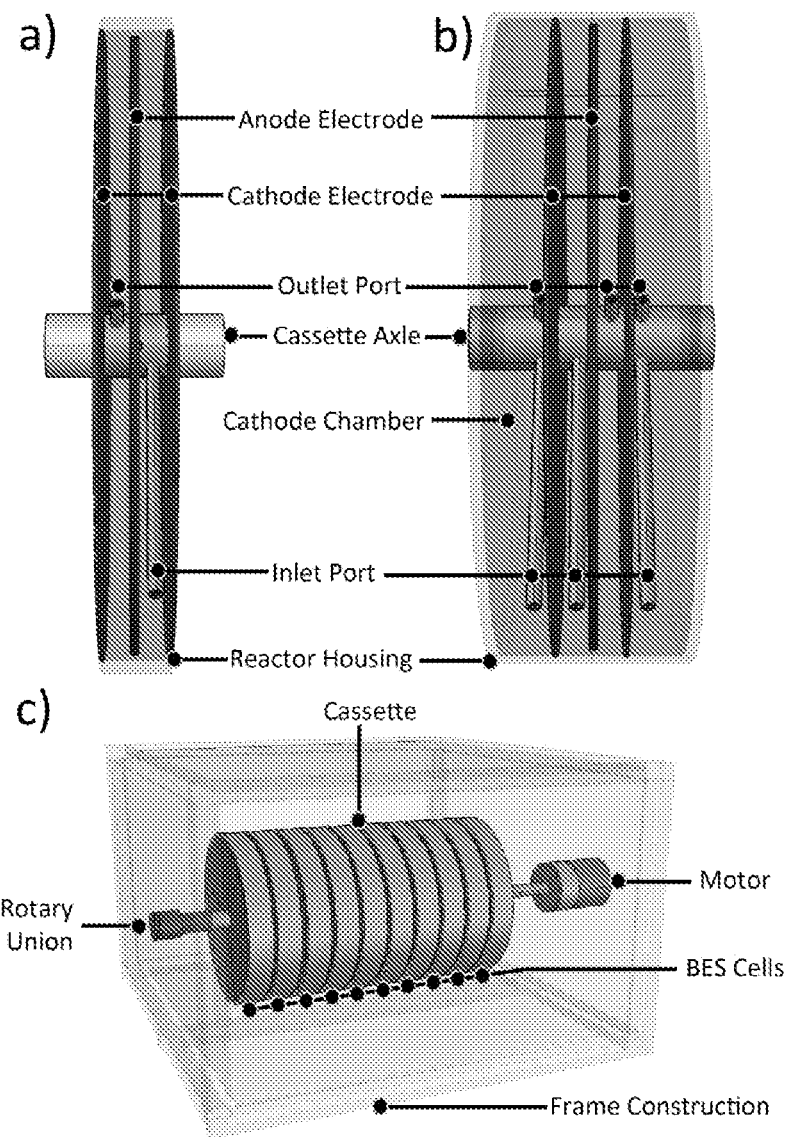
FIG. 6A is a schematic depicting an exemplary embodiment of one configuration for an anode/cathode cassette with exposed cathodes for use in a multi-output bioelectrochemical system optimized for space-based life-support applications (microgravity), in accordance with the invention.
FIG. 6B is an alternative exemplary embodiment of one configuration for anode/cathode cassettes, each configured with individually an controlled cathode chamber for use in a in a multi-output bioelectrochemical system optimized for space-based life-support applications (microgravity), in accordance with the invention.
FIG. 6C is an exemplary embodiment of a plurality of the anode/cathode cassettes depicted in FIG. 6A housed in a global cathode compartment.
FIG. 6D is a cut-away cross-sectional view of the cassette depicted in FIG. 6A.
FIG. 6E is a cut-away cross-sectional view of a cassette similar to the cassette depicted in FIG. 6A, but including two anodes instead of one.
Figure 6:
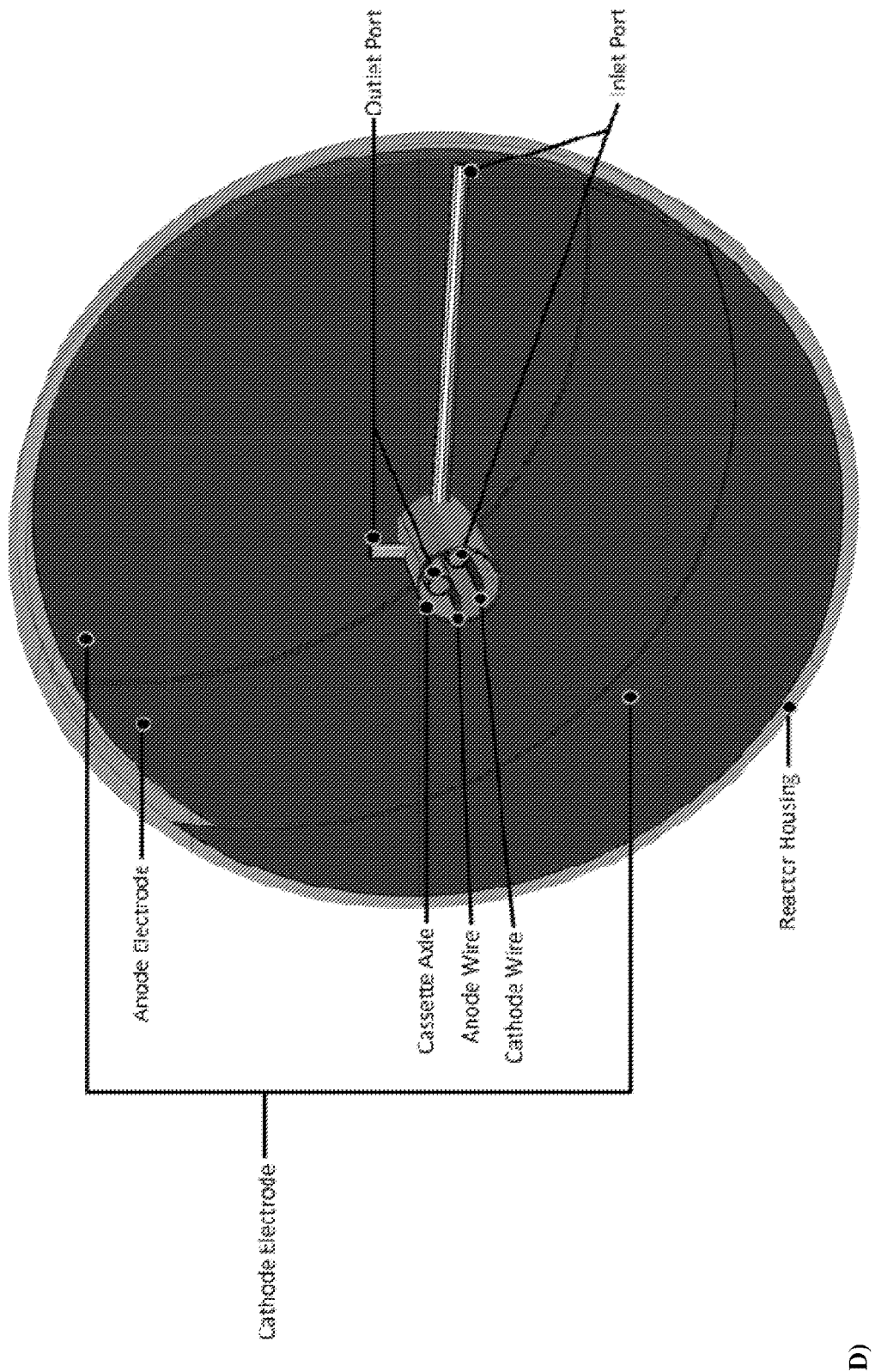
Figure 6:
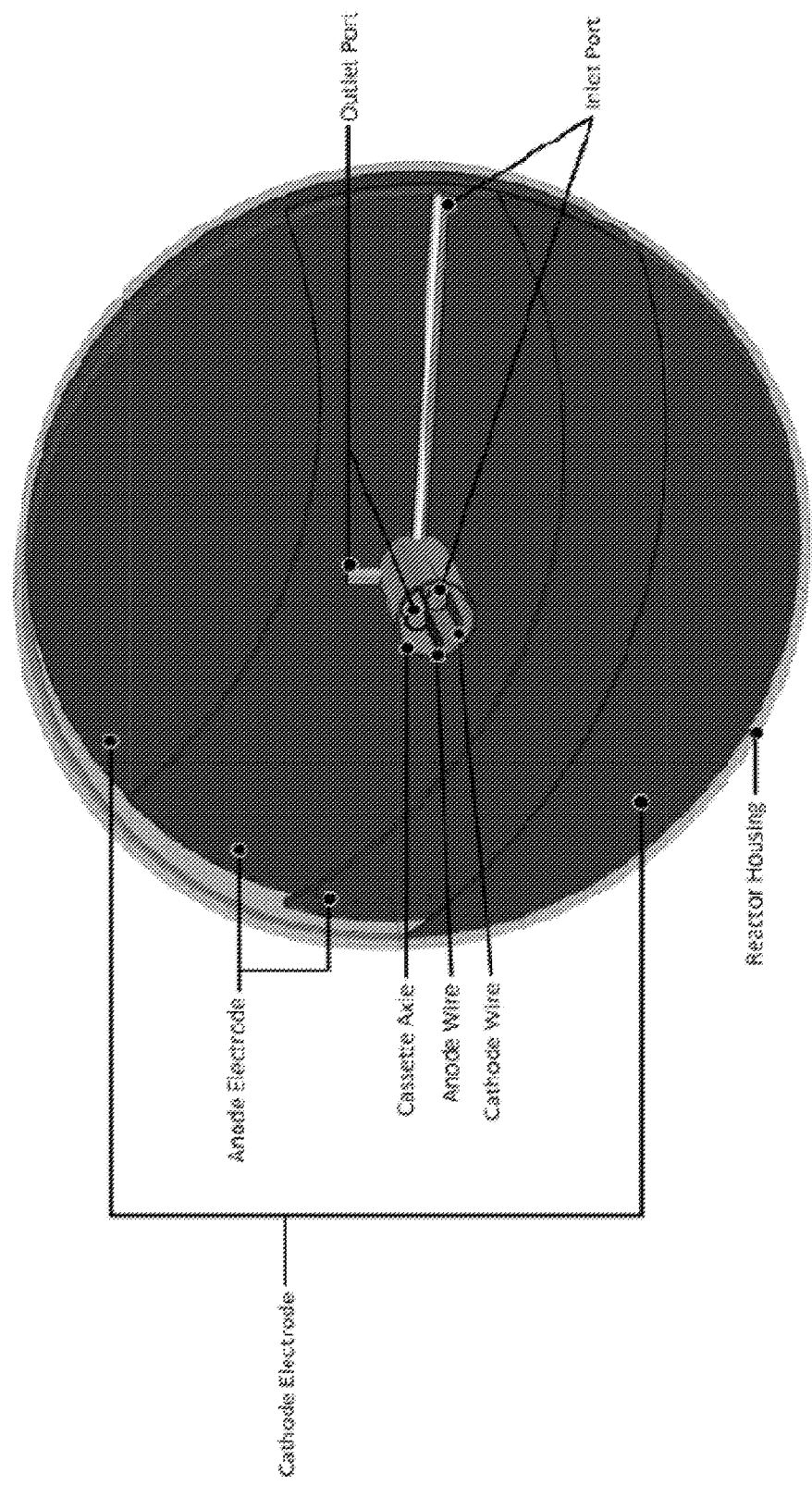

In the one configuration of the invention optimized for space-based life-support applications, a system architecture is used that can effectively separate solids, liquids and gases in a microgravity environment. In this embodiment the anode chamber and/or cathode chamber are rotated to ensure effective separation of solids, liquids and gases. In one embodiment, the anode is disk-shaped and housed in a cassette that can rotate around a central axle (FIGS. 6A and 6D). In certain embodiments, the cassette includes more than one anode (FIG. 6E). In one embodiment the sides of the anode cassette are comprised of a chemical cathode with the electrodes exposed to the outside of the cassettes. In this embodiment the entire cassette is itself disposed in a larger compartment that can rotate separately from the anode cassette and in the same or different directions (e.g. the cathode compartment). In this embodiment one or more anode cassettes can be housed in a single, central/global cathode compartment (FIG. 6C).

The proper functioning of the rotating cassette BES depends on the use of inlet and outlet ports at the locations which enable solids, liquids, or gases to be introduced or removed from the anode and cathode compartments. In one embodiment, the interior of the anode compartment will contain inlet and outlet ports which open at different diameters along the radial edge of the cell. Heavier anode constituents, such as solids and liquids can be introduced or removed from the cell as a function of their distance from the radial edge. The rotation of the configuration will separate gases, such as $CO_2$, and solids generated at the bio-anode during chemical oxygen demand (COD) oxidation.

1.2 Example 2: Three-phase Separation in Microgravity—Embodiment 2

In another configuration of optimized for microgravity, a BES cell or cells containing a bio-anode and two cathodes contained in disc shaped cassettes rotating around a central axle, will be housed in a series of individually controlled cathode chambers (FIG. 6B).

1.3 Example 3: Detailed design considerations

Provided below are some more detailed aspects of the multi-output BES design, particularly as they apply to the microgravity environment. Process requirements to consider during this period are treatment rates, liquid flows, expected gas production, current consumption/production, and solids buildup. Designing a system addressing these process requirements will ensure proper sizing of the reactor and minimize any disruption to downstream systems in future. The design of support systems such as solids filtration and gas separation will be addressed.

BES Cell/Cassette

The system can consist of a cassette installed inside of the reactor body. The cassette can consist of a number of annulus-shaped BES cells installed around a central hollow axle. This cassette will likely be mounted to the reactor body in such a way that it can be rotated by an electric motor.

The BES cells can be constructed from two frames which will mate and seal together using gaskets and bolts. When mated, they will contain a hollow chamber inside, which will hold the anode electrode and hydraulic lines. The edge walls will be the cathode membrane electrode assembly. The frames will be annulus-shaped in order to fit around the cassette's axle. High density polyethylene (HDPE) can be used as the frame material for the BES cells. The design will be fully specified in this sub-task and a highly detailed CAD model will be required in order to machine the final prototype. The detailed body design will feature attachment points for the anode electrode and cathode MEAs, hydraulic lines, mounting points for attachment to the cassette axle, channels for gaskets, and bolt holes. The thickness of the anode chamber inside the frames will be determined as a result of system optimization.

Anodes can be constructed from a range of materials, for example a plastic mesh substrate with an epoxy ink coating applied to the surface. The cathode can be manufactured from Nafion membrane, platinum catalyst, and a gas diffusion layer. The quantity of platinum catalyst needed for optimal performance has not yet been specified, but will be determined as a result of optimization. The current collector used for the anode will be a bolt, nut, washers, and wire made of grade 2 titanium, and the cathode will use a similar construction made of 316 stainless steel.

In the above design of the BES cell, the cathode MEA is open to the atmosphere of the reactor body. It is believed that this design will minimize mass and complexity. Another design would involve using a similar BES cell construction. In this case, the cells would be constructed of two frames which are closed off from the atmosphere. The cathode MEA would release any product gas into the cathode frame's volume and be collected directly.

The cassette axle will be built from a metal tube, most likely 316 stainless steel. The BES cells will be fit around this axle and hydraulic lines will travel through the tube to reach each of the cells. The tube thickness and diameter will be determined as a function of motor torque capabilities, tube rigidity, and ease of installing the hydraulic lines. Adapters to mount the axle to the motor rotor and to the hydraulic and gas manifold will have to be designed.

Reactor and Structural Components

The reactor body will be responsible for housing the cassette, cassette supports, electric motor, hydraulic and gas manifold, and any peripheral ports and connections. In the current design, the reactor body will also have to be gas-tight because the cathodes on the cassette will be releasing gas into the volume. In the alternate design, this body will not have to be gas-tight since the cathode frame will collect all the gas.

The frame will be built to be structurally robust, allow flexibility, and view the operation inside. The reactor body frame can be constructed from aluminum framing. The walls can be clear polycarbonate sheets installed into the aluminum framing. Framing will be used to build a structure for the cassette supports, motor, and hydraulic and gas manifold. Any sensor or inlet/outlet ports will be installed into the polycarbonate walls using sealed through-wall adapters. Since the reactor body needs to be gas-tight, gaskets will be added between the aluminum frame and polycarbonate sheets to ensure gas-tightness, and all joints will be epoxied.

Liquid and Solids Handling: Feedstock will flow into the anode chambers by a variable pump, for example a variable speed peristaltic pump, which will provide a continuous and constant flow. Wastewater holding tanks will be used to provide flow-buffering capacity to normalize for periods of high and low loading of the wastewater systems. Depending on the final design configuration and whether the BES cells are run in parallel or series, the flow may need to be split through a manifold and introduced into cells at multiple location. The design of this system will be handled during the detailed design phase of this project. Flow rate of liquid into the test cells will need to be adjusted slightly to compensate for variations from predicted flow.

Solids are an important consideration for proper function of the system. Waste streams entering the process will likely contain small amounts of suspended and dissolved solids. In addition, as with any biological process, a small amount of solid material is produced by the function of the treatment system. Those solids which are unable to be degraded within the system must be removed to avoid accumulation. A filter system or phase separation design will prevent accumulation of solids in the reactor. The solids exiting the system will be collected through filtration and/or centrifugation and disposed of appropriately before being transferred to the next process unit.

Gas Handling: Since the same cathode MEA electrode will be utilized for both the MFC and MEC reactions, switching between the modes will require the atmosphere to be changed out: MFC mode will require an aerobic environment while MEC mode will require changing the atmosphere to be anaerobic. The approach and the time scale for switching between operation modes will be evaluated to optimize the efficiency within the constraints of the operation specifications in this sub-task.

The need to switch the atmosphere of the reactor body also requires separate gas connections and control valves to facilitate the switching operation. Gas delivery to the reactor body will be dependent on the cell mode selected. For this prototype design, the likely design will be an air and anaerobic tank connected to the reactor body through solenoid valves and a distribution manifold. The valves will be actuated by the control software depending on the mode in operation. Removal of gas from the system will be through a common exit manifold. The objective of the design will be to minimize the number of components required and to simplify the steps required for each modal change.

Hydraulic & Gas Manifold

The hydraulic and gas manifold is one of the most complex components of the system: it must interface between the stationary reactor body and the spinning cassette. This manifold must be able to allow passage of liquid and gas to the inlets and outlets of each cell in the cassette. Multi-passage rotary unions have been identified to address this issue, and some stock products features 12 independent hydraulic lines and the ability to connect more than 36 electrical circuits. Products like this are ideal and necessary to transfer flow to and from the cassette, though independently developed systems can also work. Depending on the results from the above sub-tasks, the current product may change. Future revisions of the system will require a different number of passages and circuits; customization of similar products which may address future goals and operate in zero-gravity environments will need to be explored. Additionally, if a flow manifold is installed on the cassette to split flow from a single line, it may be possible to use a 2-passage rotary union in future designs to lower complexity. This rotary union also has the strong benefit of providing enough electrical circuits to monitor all of the BES cells independently and have enough lines to support the installation of a few sensors.

Electrical Systems & Controls

A control system will be designed which will be able to collect all reactor performance data, handle all inputs and outputs from the system, and utilize programmed logic to change process equipment operation and BES modes. This final system will utilize logic based on modeling and results to determine optimal operating parameters for the system. The hardware will be used to measure system performance, communicate with the logic, and control process equipment will from off-the-shelf components.

The primary responsibilities of the control system will be the control of liquid handling, solids handling, gas handling, gas mode switching, and electrical mode switching, along with recording system operation. The control system will take input data such as reactor current performance, feed tank level, system pressures, gas composition and quantity, liquid flow rates, and the status of central power and hydrogen resources to make informed decisions on whether to run the reactor in MFC or MEC mode. The control system will control reactor operation by changing liquid and gas flow rates, opening valves to change out the gas in the reactor body during modal changes, adjusting cell voltage, and switch circuits to run the BES cells in MFC or MEC mode. Additionally, the control system will feature models for components which haven't been designed for this prototype. For example, in the final system, a power collection system will exist which will collect power from the BEC cells in MFC mode, and feed power to the cells during MEC mode. For this prototype, this feature will not be built yet, but software to simulate this system will be implemented in the control system.

1.4 Example 3: Multi-output Bio-electrochemical System (MOBE)

In one aspect, the present invention provides a novel electrode configuration and different chambers for treatment, described herein as a multi-output bio-electrochemical system (MOBE), which is able to switch between the production of multiple valuable by-products, including electricity, hydrogen, methane and purified water, depending on the needs of the situation in which it is being used.

In certain embodiments the multi-output bio-electrochemical cell will include at least one cathode and at least one anode. In some embodiments it will include one anode and two cathodes, with the anode located between the cathodes. The cathode or cathodes may be housed in an enclosed structure within the chamber. Voltage may be applied to the cathode in order to produce hydrogen. In the same embodiment, oxygen may be allowed into the cathode enclosure to produce electricity.

Figure 7:
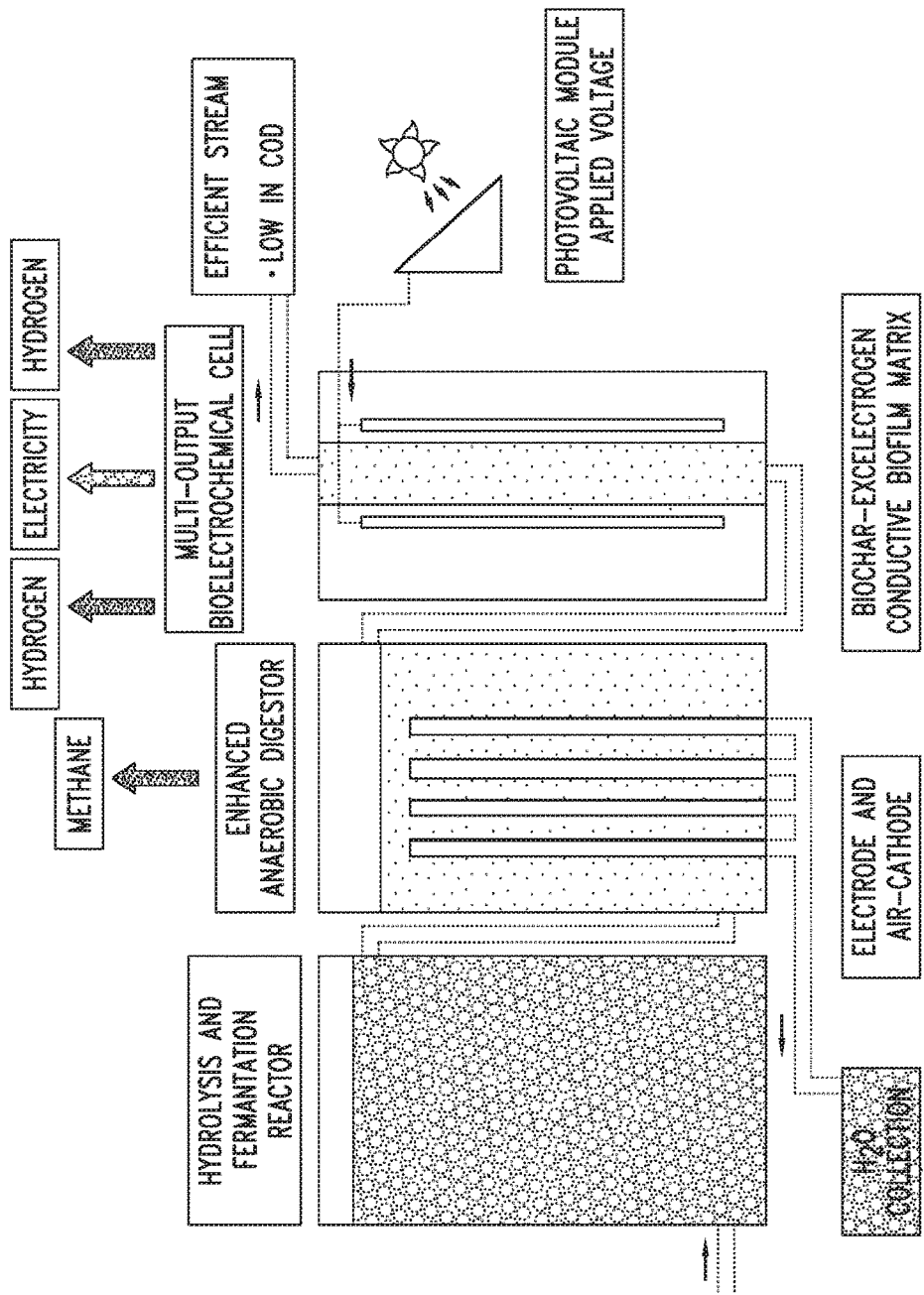
FIG. 7 is general schematic depicting the process flow of an exemplary embodiment of a three-chambered multi-output bioelectrochemical system according to the invention, where chamber 1 of the BES is a holding tank for hydrolysis/fermentation of complex waste stream, chamber 2 is an enhanced anaerobic digester and chamber 3 is a multi-output cell configured create either electricity or hydrogen.

In certain aspects, the present invention provides a three-chamber system including: 1) an initial holding tank for hydrolysis/fermentation of complex waste stream; 2) an enhanced anaerobic BES-based digester; and 3) a dual-output BES that can create either electricity or hydrogen, depending on whether a voltage is applied and oxygen allowed into the cathode chamber (see FIG. 7). This configuration results in two basic operating modes, depending on how the last chamber is operated:

MODE 1: Methane+Electricity+Pure $H_2O$ production at Cathodes

MODE 2: Methane+Hydrogen+Pure $H_2O$ production at Cathodes

In certain embodiments, a solar panel can be used to further supplement power to be used for pumps, electronics and to supplement BES-based electricity if MODE 1 is used.

Enhanced Anaerobic Digestion (Chamber 2 of the MOBE):

The second chamber is designed to remove total suspended solids (TSS) and BOD in concentrated waste water streams. Here, the system utilizes an air-cathode rather than a biological cathode. An air-cathode enhanced anaerobic digester maximizes the oxidation of COD by removing fermentative by-products as electrical current from the system. This allows for increased rates of methanogenesis and collection of potatable water from the air-cathode.

Dual-Output Bio-electrochemical Cell (Chamber 3 of MOBE)

The third chamber is designed to remove residual BOD exiting the second chamber, and a cathode will be housed in a closed chamber for either hydrogen production (with an applied voltage) or electricity production (letting oxygen into the chamber and removing the applied voltage). This system combines the electrical energy gained from the photovoltaic modules to treat the effluent streams from the enhanced anaerobic digester to produce a combination of electricity, fuel (hydrogen and methane), and water for use in auxiliary applications.

In certain aspects, the MOBE of the invention is incorporated into an invention described in PCT/US 11/32500, entitled "SCALABLE ARCHITECTURES FOR ELECTROGENIC WASTEWATER TREATMENT AND GAS TREATMENT", as an improvement thereof. The system will be comprised of three individual chambers, including a chamber which functions to allow hydrolysis and fermentation or organic waste streams reactor, a chamber which functions as the enhanced anaerobic digester (EAD), and a chamber which functions as a multi-output bio-electrochemical cell. In this configuration, the multi-output bio-electrochemical cell will treat the effluent from the EAD chamber. In an additional configuration, the multi-out put bio-electrochemical cell can operate in parallel to the EAD, thereby increasing the treatment rates/removal of organics from the waste water. In certain embodiments the multi-output chamber can be used to remove nitrogen species (including, ammonia, nitrate and nitrate) that are present in the waste water.

In certain embodiments, the MOBE of the invention is configured to include four separate chambers, each optimized for a reduced system footprint. Traditional design considerations of BESs seek to maximize electricity production while minimizing methane formation. The present invention flips this paradigm, using bio-electrochemical processes to instead accelerate methane formation. Depending on system operation, the electrons liberated from the anode chamber will be utilized for a variety of functions, including electricity or hydrogen production, and contaminant reduction. The net result is a compact BES, with the ability to separately treat dark and gray waste water while producing valuable biogas for use as heat (e.g., in generators or portable fuel cells).

Figure 8:
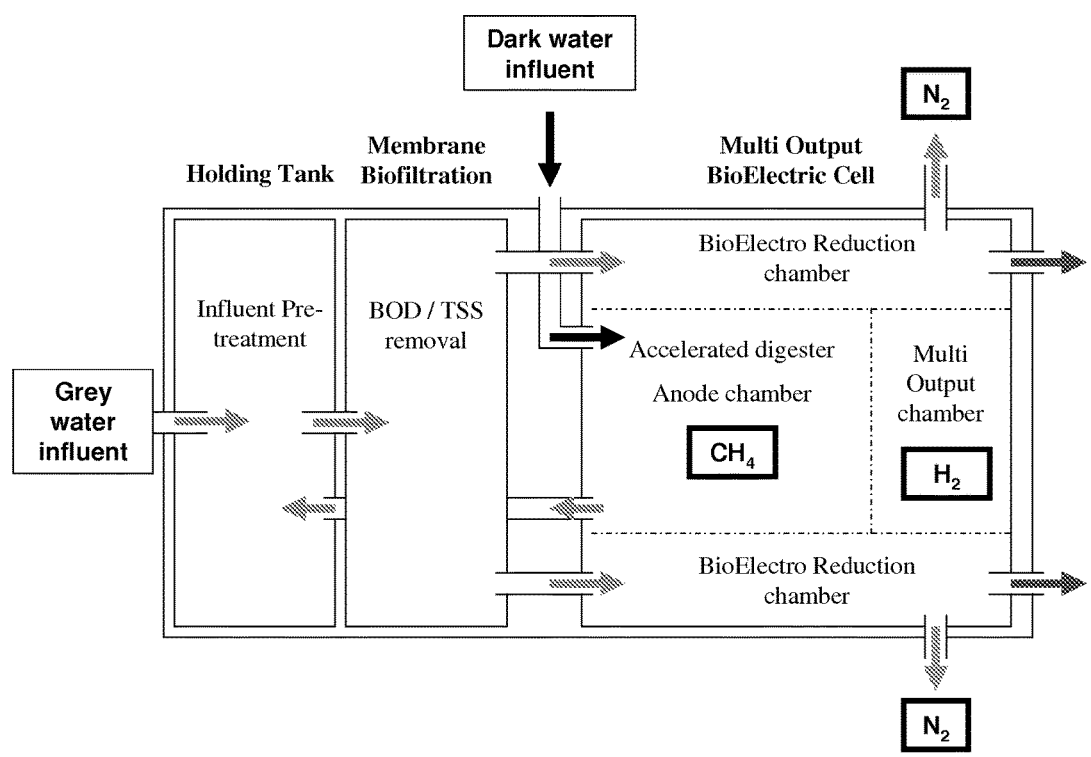
FIG. 8 is a schematic depicting an exemplary embodiment of a four-chambered multi-output bioelectrochemical system according to the invention, where chamber 2 serves as the multi-output cell.
Figure 9:
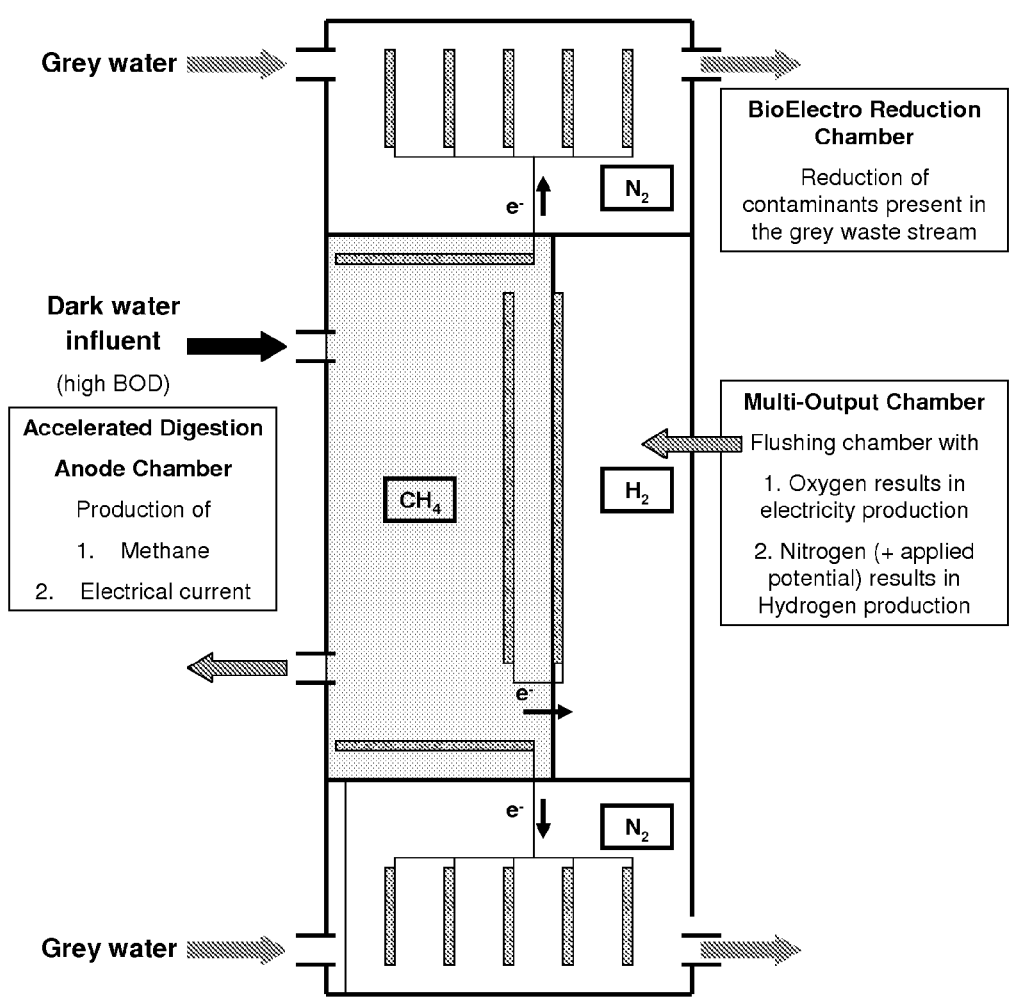
FIG. 9 is a schematic depicting an alternative exemplary embodiment of a four-chambered multi-output bioelectrochemical system according to the invention, where chamber 2 serves as the multi-output cell and is configured to generate either electricity or hydrogen.

The four-chambered configuration can be designed to separately treat a combination of gray and dark waste water. In one embodiment of a four-chambered configuration, chamber 2 serves as the multi-output bio-electrochemical cell. The anode chamber is adapted to multiple tasks, including: 1) promoting accelerated anaerobic digestion; 2) providing electrons for the production of valuable by-products (hydrogen, electricity, etc.); and 3) providing electrons for the reduction of contaminants from the grey waste water stream. Schematics of this four-chambered configuration where chamber 2 serves as the multi-output bio-electrochemical cell is depicted in FIGS. 8 and 9.

Figure 10:
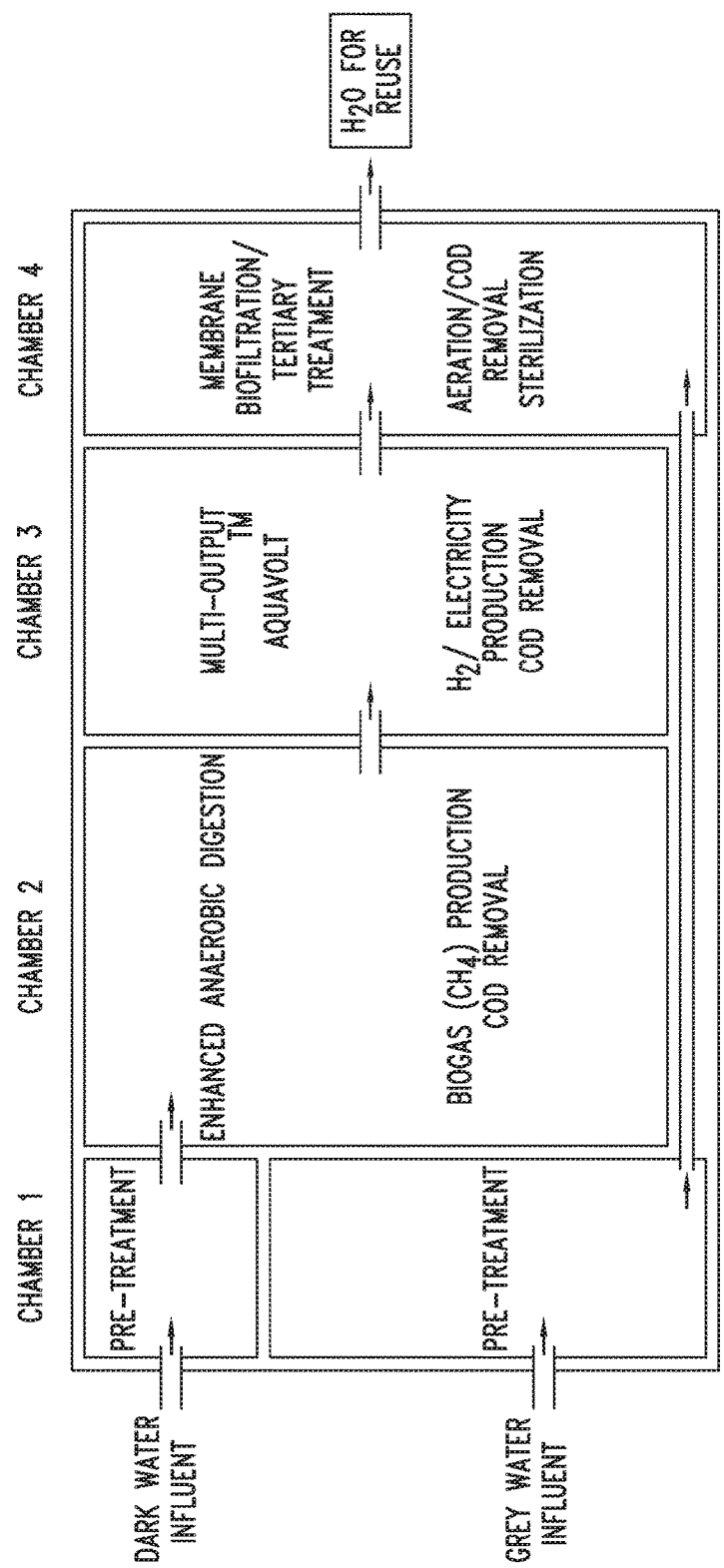
FIG. 10 is a schematic depicting the process flow of an exemplary embodiment of a four-chambered multi-output bioelectrochemical system according to the invention, where chamber 2 serves as the multi-output cell and is configured to switching between production of electricity and hydrogen.

In another embodiment, a four chambered system is capable of treating both dark and gray water while switching between value-added energetic products. This configuration is depicted in FIG. 10. In the configuration shown in FIG. 10, the system will generate methane in chamber 2 and either 1) electricity or 2) hydrogen in a multi-output Aqua- Volt™ treatment unit (chamber 3). The flexibility inherent in this configuration allows switching between electricity and hydrogen.

Figure 11:
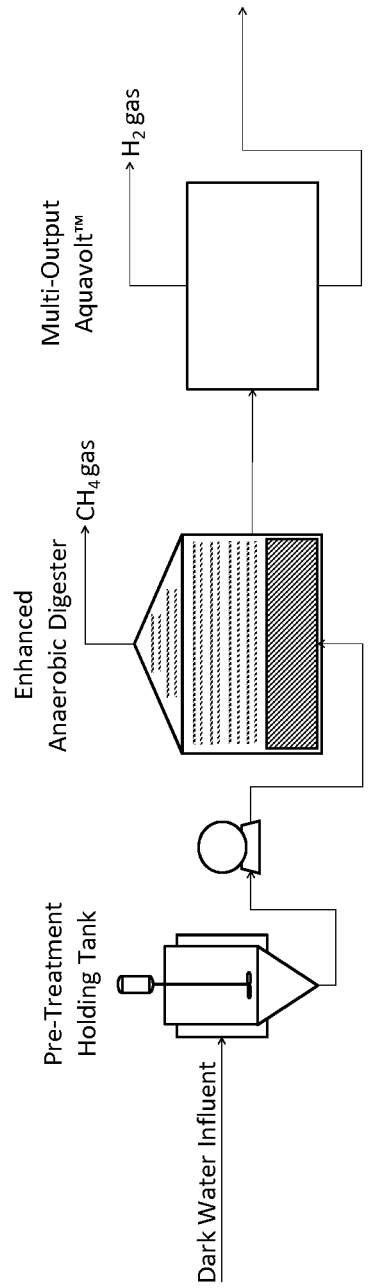
FIG. 11 is a general a process flow schematic depicting a mobile, three-chambered multi-output bioelectrochemical system in accordance with the invention where chamber 1 is a pre-treatment holding tank, chamber 2 is an enhanced anaerobic digester, and chamber 3 is a multi-output Aquavolt™.

In yet another embodiment, a mobile, three-chambered system is provided, a process flow schematic of this mobile system is shown in FIG. 11. As with the three- and four-chambered configurations described above, this three-chambered system is designed to be net energy positive, and an integrated wastewater treatment system capable of returning over 90% of the waste influent stream for a combination of potable and non-potable use. The configuration shown in FIG. 11 integrates two novel advances in BES technology: 1) a bio-electrochemically enhanced anaerobic digester (EAD); and 2) a multi-output bio-electrochemical cell (AquaVolt™).

Figure 12:
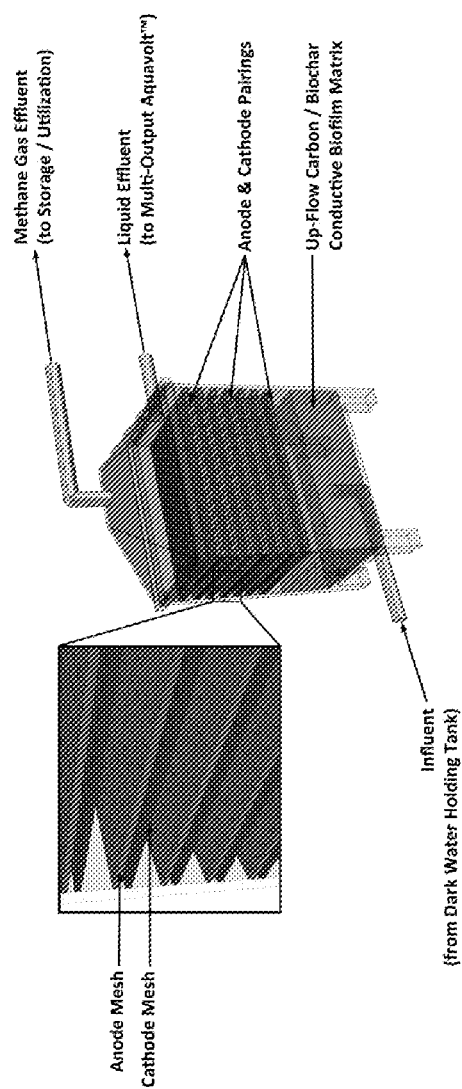
FIG. 12 is a more detailed schematic of an exemplary embodiment of an enhanced anaerobic digester that can be utilized in chamber 2 of the multi-output bioelectrochemical system depicted in FIG. 11.

A more detailed schematic of the system architecture for the EAD system component is shown in FIG. 12. In certain embodiments, the EAD chamber may be at least partially filled with granular carbon (biochar) so as to promote the growth of a conductive biofilm matrix, for facilitating organics degradation by increasing relative microbial surface area and allowing for increased synergistic microbial interactions by promoting interspecies electron transfer. The influent stream will up-flow through this biofilm matrix.

Figure 13:
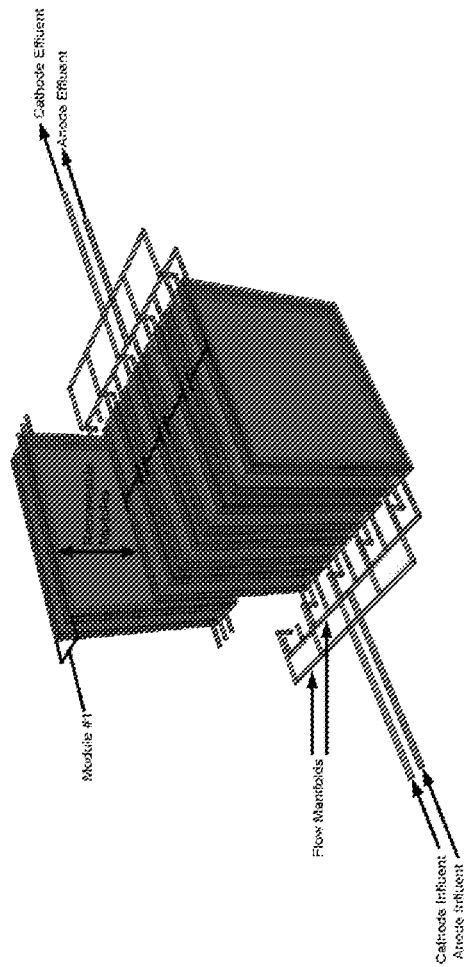
FIG. 13 a more detailed schematic of an exemplary embodiment of a multi-output AquaVolt™ cell that can be utilized in chamber 3 of the multi-output bioelectrochemical system depicted in FIG. 11.

A more detailed schematic of the multi-output Aqua-Volt™ treatment system is depicted in FIG. 13. The exact number of individual cathode-anode-cathode modules may vary. In certain embodiments, the AquaVolt™ system may include 10 cathode-anode-cathode modules. The exact dimensions of each chamber may vary. In certain embodiments, the anode chamber has a width of approximately 10 cm and cathode chamber has a width of approximately 2.5 cm, with the overall module width being approximately 15 cm. In certain embodiments, the anode and cathode chambers are separated by cation exchange membranes (CEM). The surface of the CEM facing the cathode chamber is coated in a film (catalyst-carbon black-CEM-$H_2O$). The membranes will be manufactured into frame cartridges while the modular design of the treatment system will allow the modification or replacement of components as necessary. In certain aspects, the anode electrode is composed of carbon mesh.

The system depicted in FIG. 11 is cognizant of the differences inherent in gray and dark waste water. By separating the streams and harnessing the energy present in dark waste water we propose to develop a self-sustained treatment facility that is capable of being net energy positive. In this system, the dark waste stream is fed into the Enhanced Anaerobic Digester (EAD) (Chamber 1) where significant total chemical oxygen demand (TCOD) removal (84.6%) is carried. The up-flow EAD will be designed to cope with high concentrations of both solid and soluble COD. The effluent stream from this process is supplied into the Multi-Output AquaVolt™ (Chamber 2) where additional TCOD removal (75%) is combined with either electricity or hydrogen production.

In all aspects of the MOBE systems described herein, the systems are preferably configured to be modular. For example, the modular system may be designed to fit in standard shipping containers (e.g., 12×2.4×2.6 meters). In other embodiments, the MOBE system is modular and designed to fit 12,000 gallons, treating up to 4,000 gallons/day.

In some embodiments, the MOBE of the invention incorporate photovoltaic modules to amend electrical input requirements, thereby minimizing overall power and fuel requirements. The MOBE system is net energy positive.

1.4 Applications of MOBE

Figure 14:
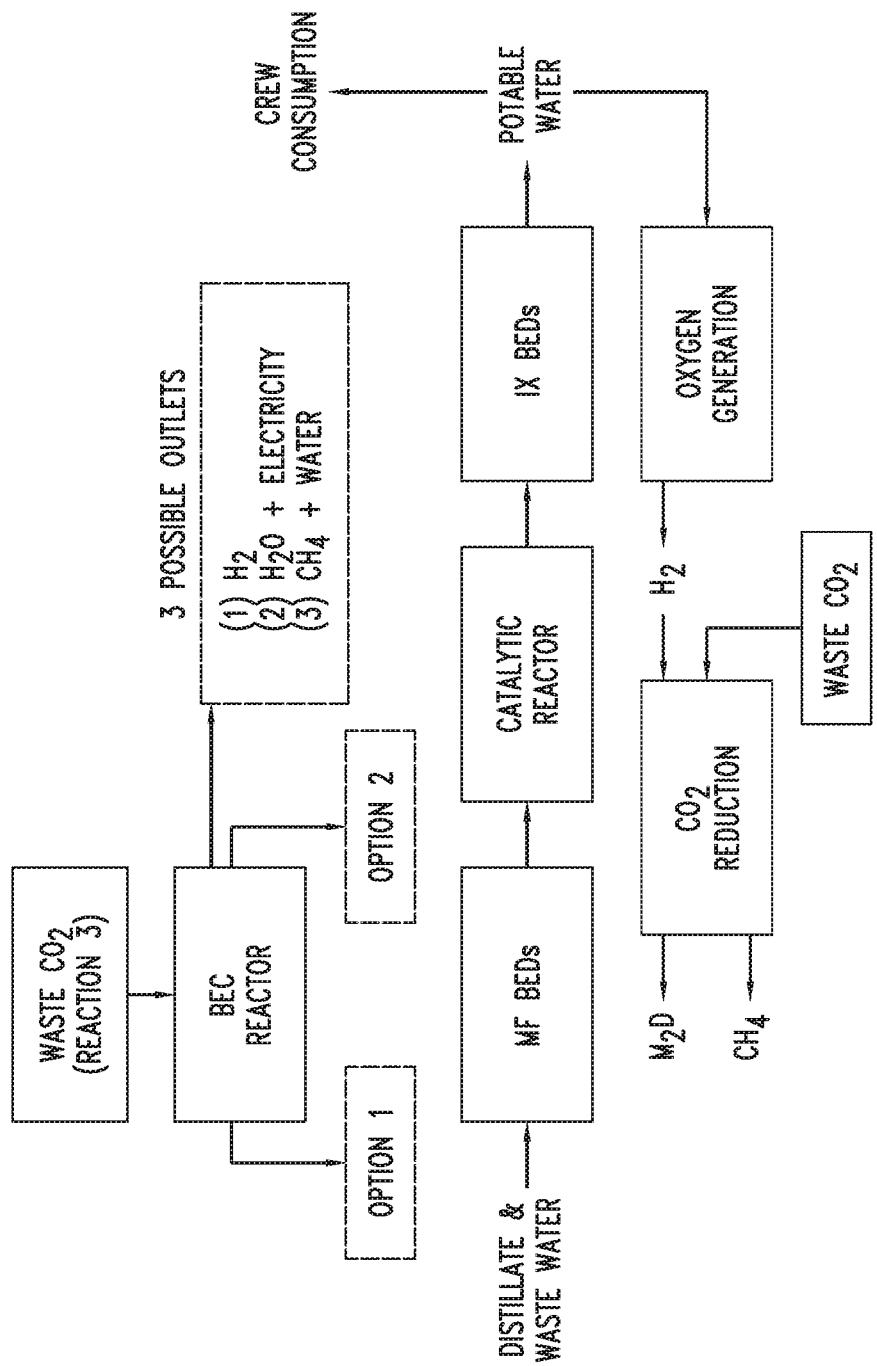
FIG. 14 is a general schematic of the process flow of an ISS Water Processor Assembly.

One of many applications for the multi-output BESs described herein involves life support. For example, the ISS Water Processor Assembly (WPA) (FIG. 14) is a combination of parallel processes designed to collect wastewater streams and remove contaminants. Wastewater streams include air condensate from the condensing heat exchanged (CHX), urine distillate from the vapor compression distillation (VCD), and wastewater generated from hygiene and related sources. Together these are stored in the storage tank before going through adsorption, a catalytic reactor, and ion exchange beds (O'Rourke et al 2006).

According to recent publications, the WPA is 85% efficient at water recovery from urine and 100% efficient at recovering potable water from the wastewater storage tank, resulting in an average water recovery of about 93%. A Sabatier process will combine waste $CO_2$ and hydrogen to generate water and methane (the latter vented overboard). Despite it's efficiency, the existing system has can be improved in the following ways:

1. Expendable Filtration Beds: The treatment of BOD/TSS requires re-supply of MF and IX beds (estimated 1040 lb/year);
2. Excess $CO_2$: There is not yet enough stoichiometric hydrogen to fully reduce the $CO_2$.
3. High power/pressure catalytic reactor: The downstream catalytic reactor requires high power, pressures, and the continuous consumption of oxygen.

New architectures for deep space exploration have been developed to address these drawbacks. Carter, Tabb and Perry, for example, have recently completed testing of an Exploration Water Recovery System (WRS) which decreases load on the MF and IX Beds by first removing volatile organic compounds (VOC) from the air in the vapor phase via catalytic oxidation. The system also passes more wastewater through the VCD system (Carter et al., 2008). While promising, the WRS process resulted in a low pH effluent from the catalytic reactor caused by increased hydronium ions, nitrate, and phosphate. These had negative effects on the ion exchange beds and inorganics from the VCD affected the MF Bed (Carter et al, 2008).

Figure 15:
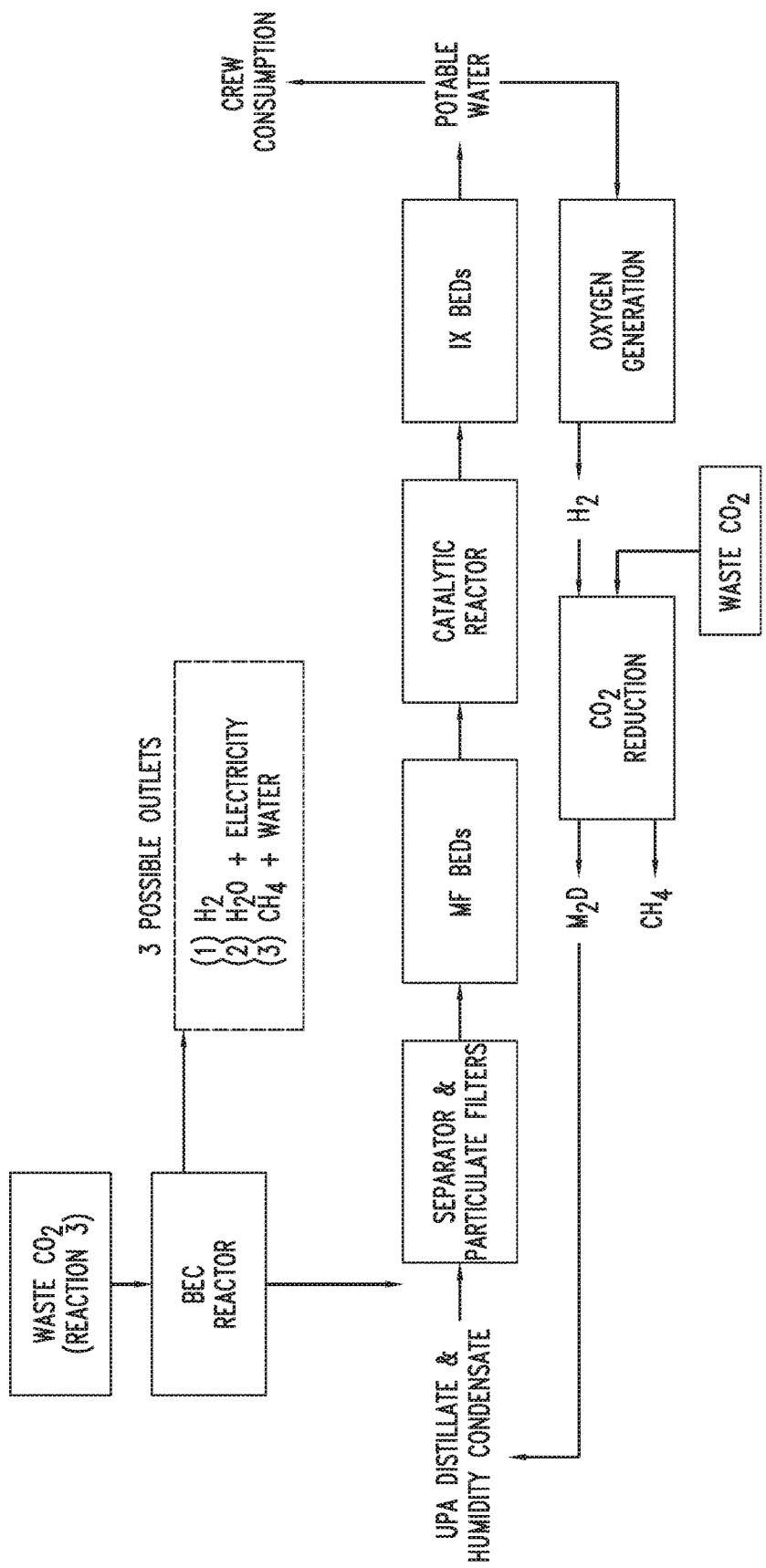
FIG. 15 is a general schematic of a process flow incorporating a multi-output BES system according to the invention into an ISS Water Processor Assembly.

A multi-output BEC could therefore be applied both prior to and directly after the MF Beds on the ISS WRA (FIG. 15). BEC anodes can be used to treat higher strength wastewater prior to entering the MF beds (option 1) or lower strength wastewater entering the catalytic reactor (option 2). In both options the BEC anode's ability to oxidize low molecular weight organics such as acetic acid and ethanol will reduce the load on the catalytic reactor and IX beds.

The proposed system might also find use in other mobile water treatment applications. In particular the military may find the flexibility of the proposed system useful for treating water at mobile bases, such as forward operating bases. Finally, the system might prove useful for wastewater treatment for humanitarian applications such as disaster relief or developing world infrastructure.

2 Microbial Electrodialysis Cell (MEDC)

In another aspect, the invention provides an integrated BES and electrodialysis system, referred to herein as a microbial electrodialysis cell (MEDC).

Traditional Electrodialysis (ED) treatment is an electrochemical process in which ions migrate through ion-selective semi-permeable membranes as a result of their attraction to two electrically charged electrodes. The contaminants that can be treated by this process include: nitrate and nitrite, barium, phosphate, selenium and total dissolved solids (TDS). An EDR unit is capable of removing from 50% to 94% of dissolved solids from feed water with typical operating conditions at 1,200 mg/l TDS. The disadvantage typically associated with this process is the energy cost required in the treatment and the production of large volumes of concentrated brine.

The MEDC of the invention is a unique product that combines the advantage of rapid nitrate removal of a Bio-electrochemical Electrodialysis Reversal (EDR) system with the improved treatment capabilities of a modified BES. The proposed integration of ED technology with an enhanced bio-electrochemical system (BES) provides a state-of-the-art treatment process for heavily contaminated nitrate waste streams. The combination of these two technologies provides an environmentally sustainable process that is capable of simultaneously treating high concentrations of nitrate while producing low levels of sludge and requiring a favorable C/N ratio. This integration of technologies gives the product a distinct advantage over comparable products which are limited by inherent limitations (i.e. concentrated brine waste, sludge production, high C/N ratio requirements).

Figure 16:
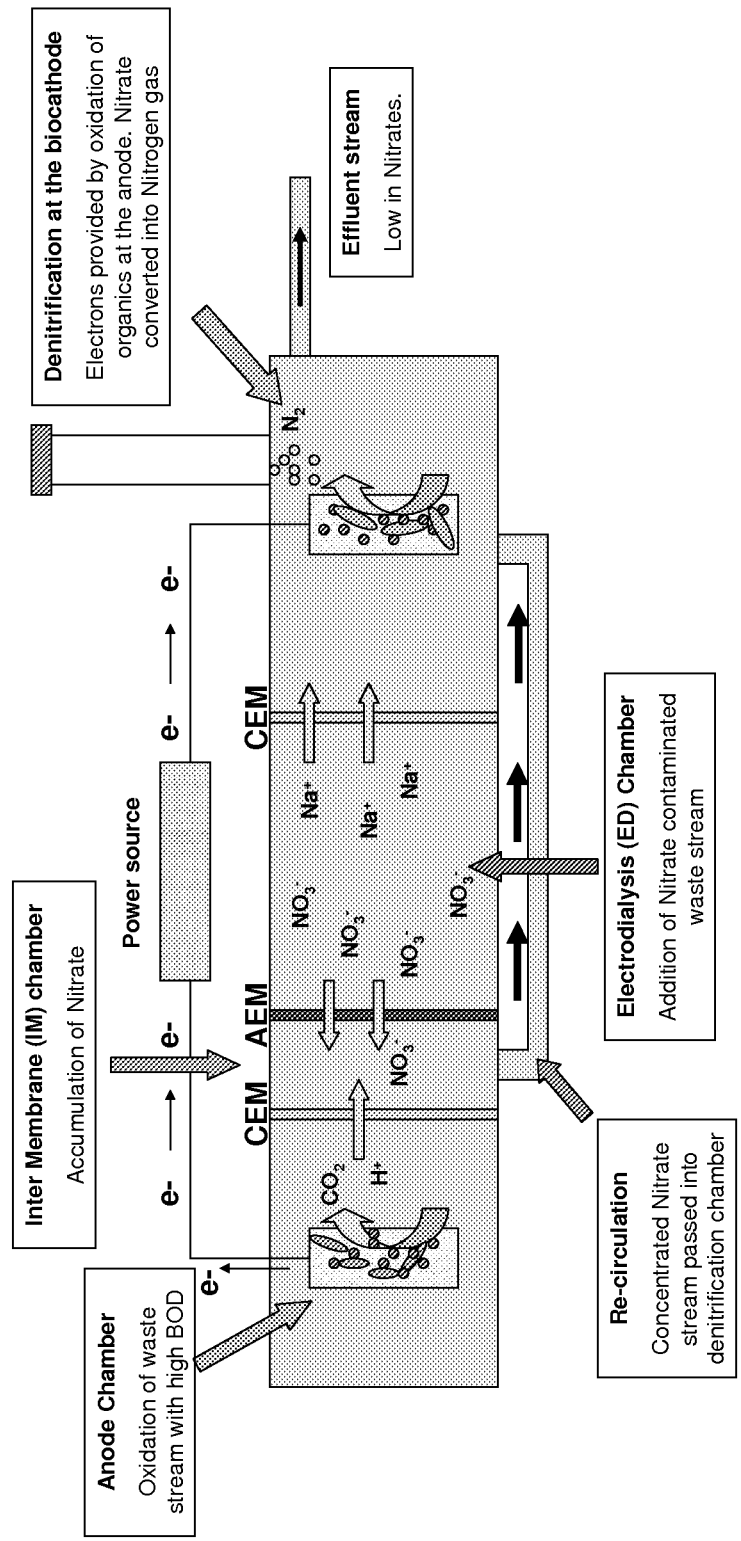
FIG. 16 is a general schematic depicting an exemplary embodiment of a microbial electrodialysis cell (MEDC) in accordance with the present invention.

A general schematic of the MEDCs provided herein is depicted in FIG. 16. The integration of electrodialysis technology and the enhanced BESs described herein provide a state-of-the art treatment process for heavily contaminated nitrate waste streams. The combination of these technologies provide an environmentally sustainable process that is capable of simultaneously treating high concentrations of nitrate while producing low levels of sludge and requiring a favorable C/N ratio.

The invention is a BES where there may be two or more electrodes poised to drive nitrates and charged species into a chamber in a Bioelectrochemical Electrodialysis Reversal (EDR) process. Preferably, high surface area materials are utilized for the electrodes (e.g., graphite granules).

Unlike standard EDR, in certain embodiments the system will include electrodes coated with electrogenic biofilms. This novel system uses membranes to first concentrates nitrates in a separate chamber, much like an ED system, and then flows this effluent back over the cathodic electrode where nitrate are removed by a bio-film on the electrode. In a particular embodiment, *Paracoccus denitrificans* and/or *Geobacter sulfurreducens* are utilized in the production of the biofilm.

In all embodiments, the MEDC will be comprised of multiple internal compartments arranged sequentially, including at least one chamber containing an anode, an inter membrane accumulation chamber, a chamber in which electrodialysis will occur, and a chamber containing a cathode. The cathode chamber may be separated from the electrodialysis chamber by a selectively permeable membrane, which, in the preferred embodiment, will be a cation exchange membrane.

The anode and electrodialysis chambers will be separated by a chamber, the purpose of which is the accumulation of waste (the inter-membrane chamber), which may include, by way of example rather than limitation, negatively charged ions such as nitrates, radium, arsenic, perchlorate, fluoride, uranium and selenium. The anode may be separated from the inter-membrane chamber by a selectively permeable membrane, which in the preferred embodiment, will be a cation exchange membrane. The inter-membrane chamber may be separated from the electrodialysis chamber by a selectively permeable membrane, which, in the preferred embodiment will be an anion exchange membrane.

In all embodiments dark water influent will enter the anode chamber and the anode will oxidize biological oxygen demand (BOD) in the dark water streams. The anode may be conditioned with selective organics. In some embodiments a reference electrode may be included to poise the anode at a voltage between −0.3V and 0.6V versus a Standard Hydrogen Electrode (SHE). In some embodiments, the cathode may be so poised.

In some embodiments the cathode will be a Membrane Electrode Assembly. In some embodiments the cathode will be contained in an aqueous chamber. In other embodiments, the cathode will be contained in a gas chamber.

In certain embodiments, the sequence of chambers will function to drive contaminants, such nitrate, from the electrodialysis chamber, through an anion exchange membrane, into the inter-membrane chamber, where such contaminants, being unable to pass through the cation exchange membrane into the anode chamber, will concentrate as a brine. In some embodiments the anode will oxidize the waste stream with high BOD, allowing contaminants comprised of negative ions, such as nitrate, to pass through to the inter-membrane chamber.

In certain embodiments, the sequence of chambers will function to drive contaminants, such nitrate, from the electrodialysis chamber, through an anion exchange membrane, into the inter-membrane chamber, where such contaminants, being unable to pass through the cation exchange membrane into the anode chamber, will concentrate as a brine. In some embodiments the anode will oxidize the waste stream with high BOD, allowing contaminants comprised of negative ions, such as nitrate, to pass through to the inter-membrane chamber.

In other embodiments, a traditional Microbial Fuel Cell (MFC) may be included in the system by replacing the external voltage source with an external resistor to induce the electrons generated by the oxidation of the anode waste stream by electrogenic bacteria to pass to the cathode. In some embodiments the electricity can be stored externally. In some embodiments voltage applied from an external source or external storage may be used to poise the anode and cathode so as to reverse the direction of the flow of ions in order to clean the system.

In some embodiments, the brine held in the inter-membrane chamber will continuously circulate between the inter-membrane chamber and the cathode chamber, where the nitrates or nitrites may be reduced into nitrogen gas.

In some embodiments a second inter-membrane chamber may be included between the ED chamber and the cathode chamber and the brine will circulate through the two inter-membrane chambers. This embodiment will allow for continued electrodialysis of charged species as the polarity of the system is reversed. The switching of polarity of the system can be used to remove scaling build-up from each membrane. The switching of polarity can be attained through the operation in MFC mode with an external resistor or in MEC mode with the application of an additional power source.

The advantages of the MEDCs of the present invention include, but are not limited to:

1. Reduced concentration in effluent streams—Unlike typical ED treatment processes this system does not produce concentrated brine streams that require downstream treatment.

2. Energy Efficiency due to bio-electrochemical assist—The system will generate electricity for direct use by the customer to offset operating requirements and reduce overall energy intensiveness of treatment.

3. Potential for combined carbon and nitrogen removal: If used at a wastewater treatment plant, the system can use BOD that must be treated as the electron source. In this way, the system can treat both highly concentrate carbon and nitrogen streams.

4. Future applications—The system can be adapted to treat most dissolved solids in complex waste streams.

Figure 17:
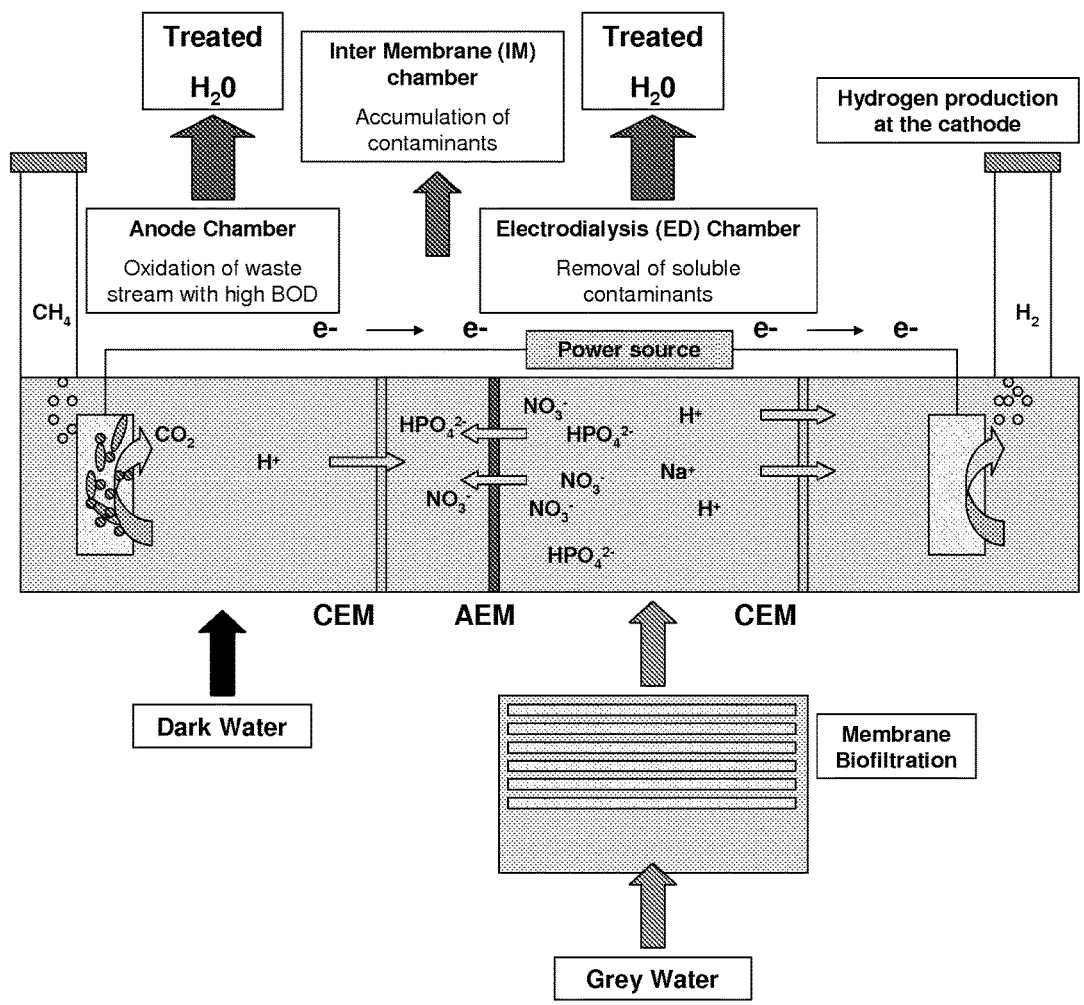
FIG. 17 is a general schematic depicting an exemplary embodiment of a bioelectrodialysis cell (BEDC), in accordance with the present invention.

2.1 Example 4: Mobile Bio-electrodialysis System (MBEDS): Bio-augmented, Self-sustaining Waste Water Treatment In a particular embodiment, the invention provides a multi-unit mobile bioelectrodialysis system (MBEDS). This novel system combines BES systems with ED systems in a new cell referred to herein as a Bioelectrodialysis Cell (BEDC) (FIG. 17). The proposed integration of ED technology with an enhanced bio-electrochemical system (BES) provides a state-of-the-art treatment process for both dark and grey waste water streams. The combination of these two technologies should provide an environmentally sustainable process that is capable of separately and simultaneously treating grey and dark waste water.

Figure 18:
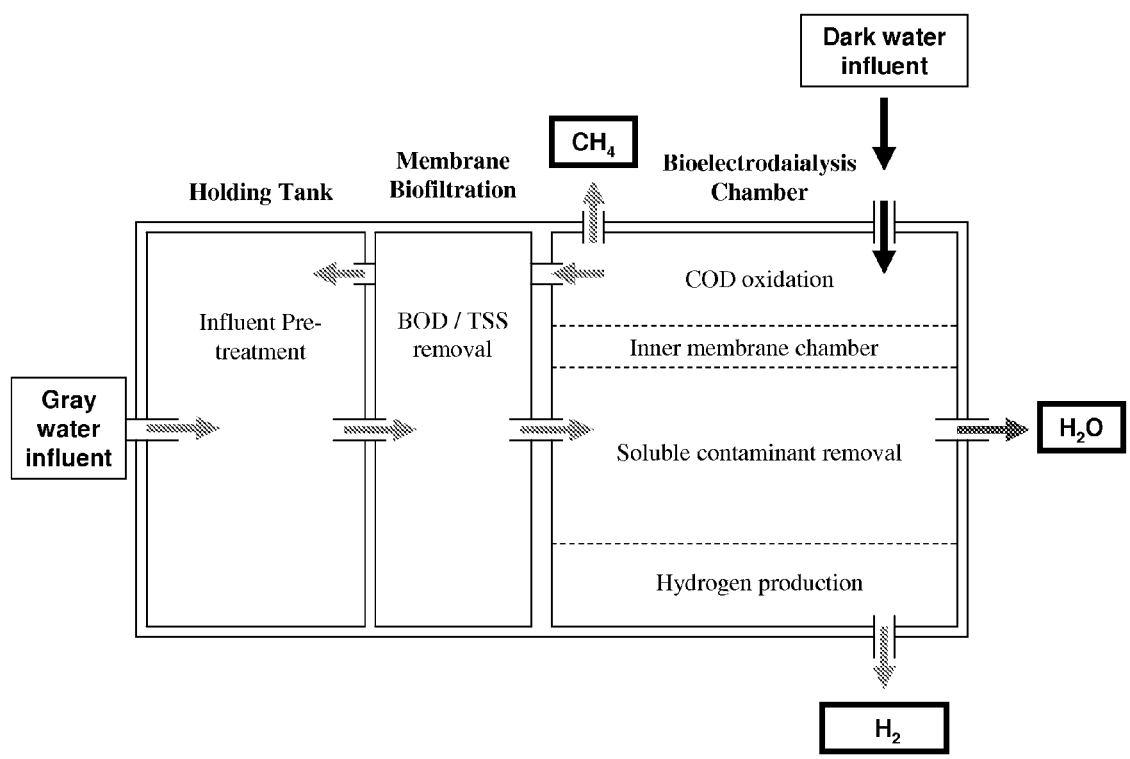
FIG. 18 is an exemplary embodiment of a multi-unit mobile bioelectrodialysis system (MBEDS) in accordance with the present invention.

The MBEDS configuration includes three separate chambers, each optimized to allow for a reduced system footprint: 1) a chamber which functions as a pre-treatment holding tank; 2) a chamber which engages in biofiltration using a membrane and 3) a bio-electrochemically augmented electrodialysis system (FIG. 18). The core of this configuration is the third chamber.

Grey water influent will first enter the holding tank chamber where it will undergo pre-treatment, such as pH adjustment. In some embodiments influent will cycle continuously through the holding tank chamber and the membrane biofiltration chamber, in which removal of BOD/TSS will occur.

Dark water will enter into the bio-electrodialysis cell through the anode chamber, where COD oxidation will occur. The oxidation of COD in the anode chamber will generate methane to be harvested for use as fuel.

Effluent from the membrane filtration chamber will enter the electrodialysis chamber. Contaminants, such as nitrates and/or phosphorous will pass from the electrodialysis chamber through a selectively permeable membrane into the inter-membrane chamber where they will concentrate. Electrons produced by oxidation of COD at the anode will flow to the cathode, generating electricity. Alternatively, voltage from an external source can be applied to the system to generate hydrogen through electrolysis. Oxidation of COD at the anode will also generate methane which can be collected for use as fuel.

2.2 Example 5: Inter Membrane Re-circulation MEDC

In this configuration, the inter-membrane chamber and cathode chamber will be connected in a loop, allowing effluent containing contaminants such as nitrates to flow continuously between the inter-membrane chamber and the cathode chamber. This will allow the brine concentrating in the inter-membrane chamber to undergo denitrification in the cathode. Alternatively, a second inter-membrane chamber may be located between the electrodialysis chamber and the cathode chamber and connected to the first inter-membrane chamber. The brine circulates continuously through the two inter-membrane chambers allowing denitrification in the cathode.

2.3 Example 6: Self-sustaining MEDC Operation

Figure 19:
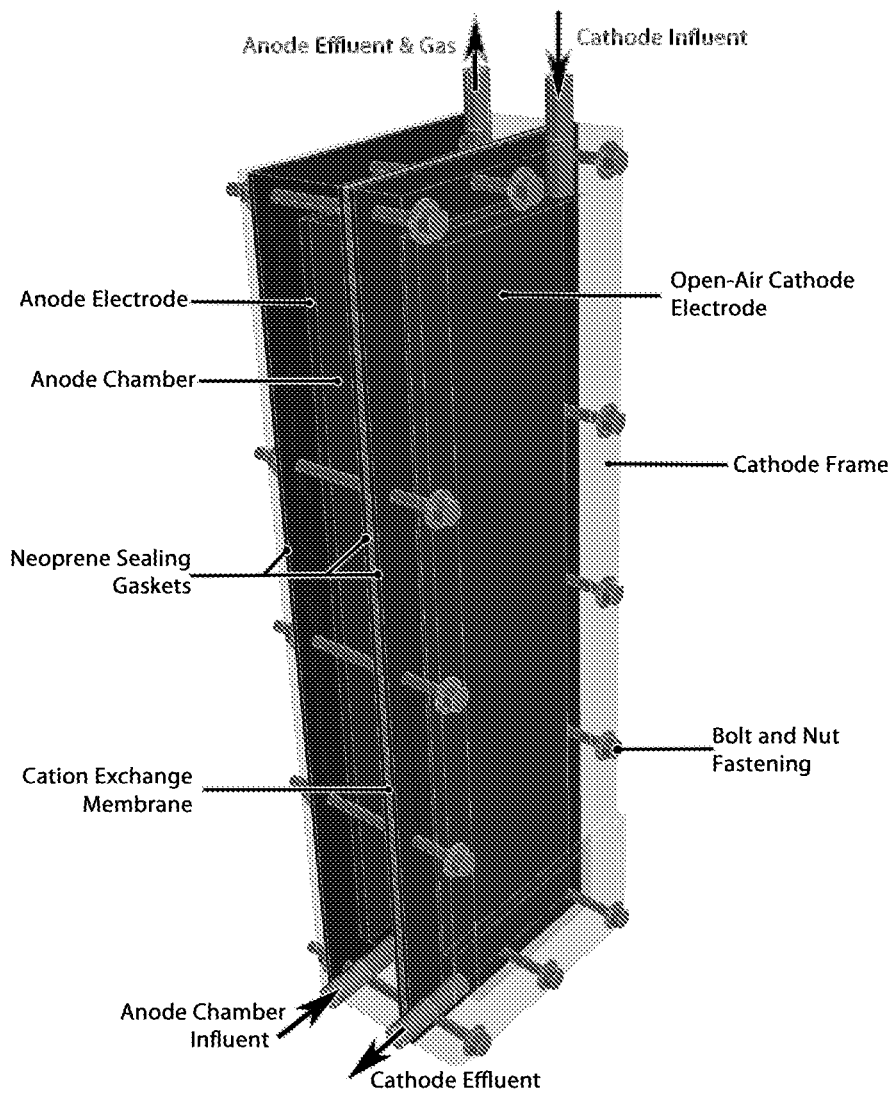
FIG. 19 is a schematic depicting an exemplary embodiment of a bio-electrochemical cell having a flat configuration designed for banked, laminar flow.
Figure 20:
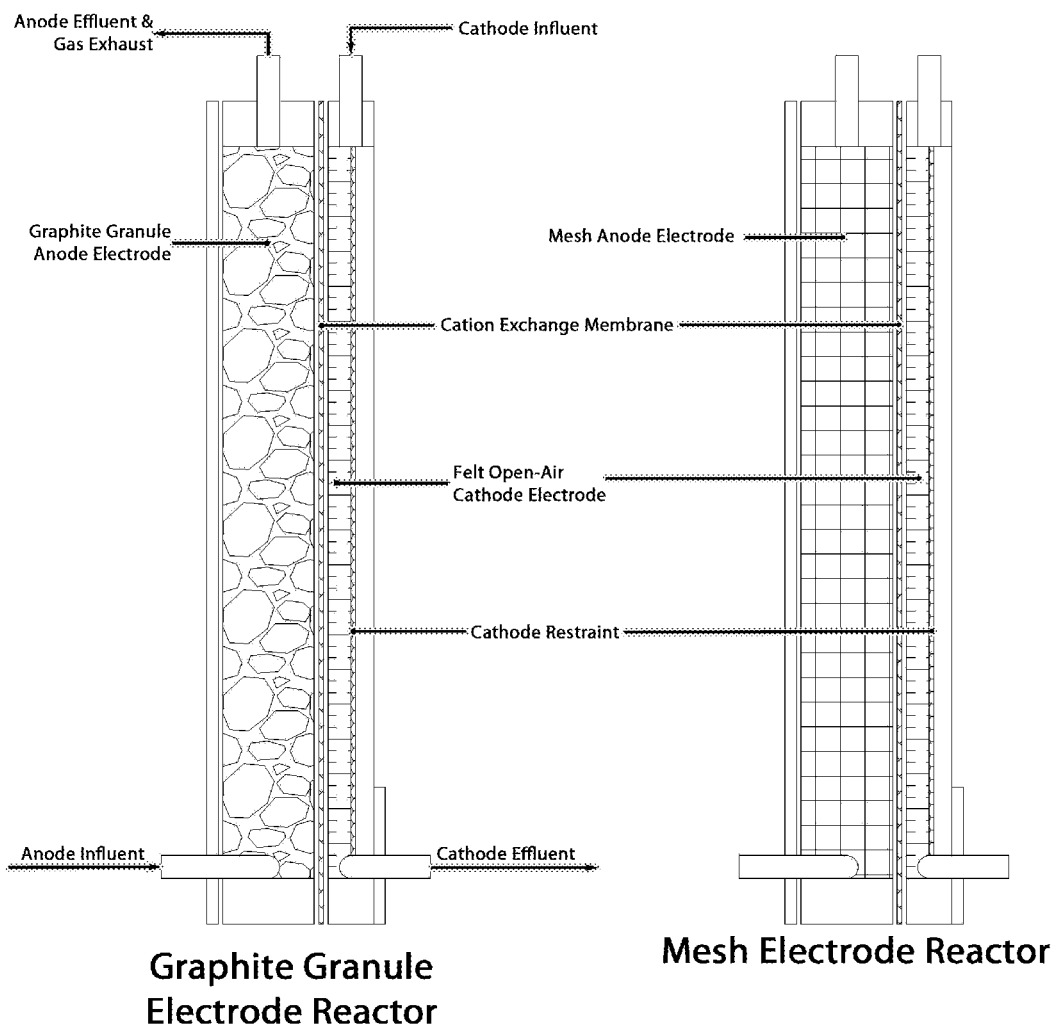
FIG. 20 is a schematic of the different electrode materials and shapes that can be used in the bio-electrochemical cell depicted in FIG. 19. For example, mesh or granules

In this configuration, the cell can be operated without the application of external voltage so that it functions as a microbial fuel cell which generates electricity. This electricity may be stored externally, such as in a battery or capacitor. The stored energy, or energy from an exterior source, may be used to reverse the polarity of the electrodes and, consequently, the flow of ions. Reversing the flow of ions may be used to clean the membranes of the system 3 Banked Laminar BECs In yet another aspect, the present invention provides a bio-electrochemical cell design as a flat or substantially flat sheet (FIG. 19). The anode is on the interior. Anodic water spills over the top onto a bio-air cathode. The cathode materials is pressed against the membrane (if present) using a wire mesh current collector. Different electrode materials and shapes can be used. For example, mesh or granules (see FIG. 20).

The invention is comprised of at least one cell containing at least one cathode and at least one anode, in which influent is pushed up through the anode into the cathode and then into an aerated holding tank or an aerated pond. In some embodiments, the top of the cell is above the water level in the aerated holding tank, and the anodic effluent flows down the side of the cathode before falling into the tank. In other embodiments the top of the cell is equal to or below the level of water in the aerated holding tank, and oxygen is supplied to the cathode via the aerated water in the broader tank or pond.

In some embodiments there is no membrane and no hydrophilic or hydrophobic barrier between anode and cathode. In some embodiments the cathode is comprised of semi-permeable conductive material. In some embodiments the cathode is comprised of activated carbon pressed against a stainless steel support structure. In some embodiments the cathode is semi-permeable and water leaves the anode chamber by seeping through the semi-permeable cathode.

In some embodiments a membrane bioreactor is used to remove residual BOD and TSS in the aerated basin. In some embodiments the membrane of the membrane bioreactor is made of conductive material. In some embodiments aeration is used on one side of the membrane to nitrify wastewater and no aeration is used on the other side of the membrane, resulting in de-nitrification. In some embodiments, electrons taken from the anode can be sent to the conductive membrane to facilitate the reduction of nitrates in the non-aerated side of the membrane bioreactor.

In some embodiments these innovations are for a complete system for extracting energy during wastewater treatment. In some embodiments of the complete system influent to the anode is the effluent from an anaerobic digester. In some embodiments influent to the anode exits the anode into the aerated basin. In some embodiments influent to the aerated basin exits the aerated basin through a wholly or partially conductive membrane of a membrane bioreactor. In some embodiments the anode electrons are sent either to a cathode adjoining the aerated basin or to the anaerobic side of the membrane bioreactor, thereby optimizing BOD removal, TSS removal, nitrification and denitrification, while generating electricity.

In some embodiments there are multiple cells receiving water in parallel. In some embodiments there are multiple cells receiving water in series. The anode may be comprised of a variety of materials capable of allowing the influent to percolate upwards, including graphite granule material or a mesh.

Figure 21:
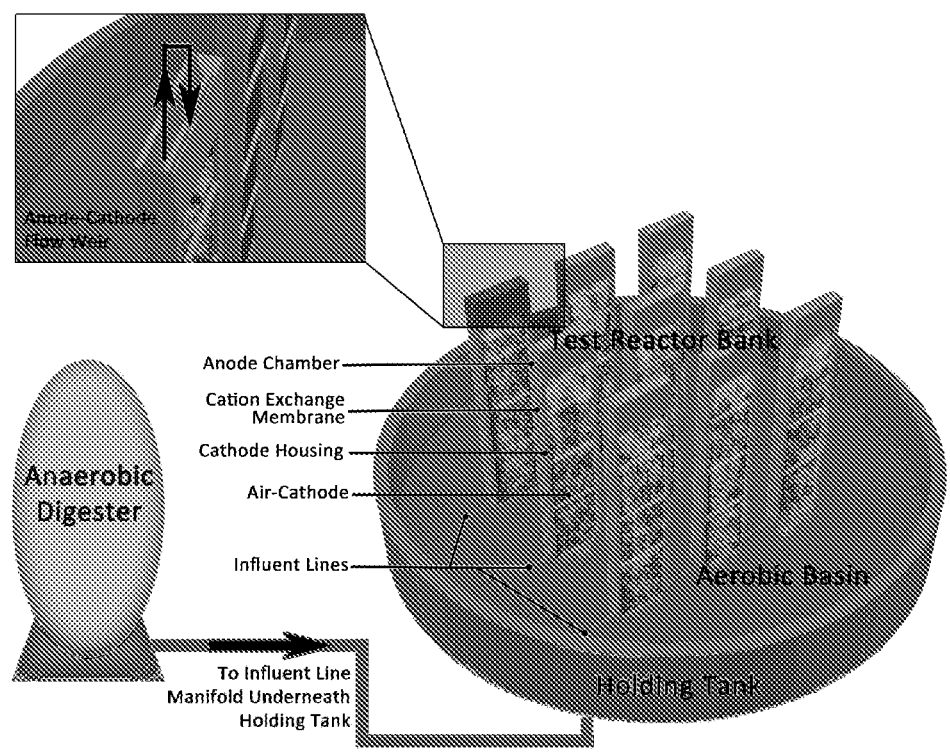
FIG. 21 is a schematic depicting a plurality of the bio-electrochemical cells of FIG. 19 deployed in use.

The key to the design is that these cells will then be placed in banks, and placed in a basin. An anaerobic digester, or similar system, will supply effluent for treatment in the anodes. Water will flow over into a holding tank. The water can be further aerated as needed to fully polish it (see FIG. 21). The system therefore treats bio-electrochemical systems as an interim step between anaerobic digesters and aeration, if aerating is needed. The key is to this invention is the simplicity of the cell designs, and creation of a bank of cells receiving water in parallel or in series from a primary treatment unit.

3.1 Applied Voltages for the Improvement of BES Performance

This invention is a process in which voltage is applied to a bio-electrochemical cell for the purpose of increasing current only. In a certain embodiment, the application of voltages to an MFC with air-bio-cathode may reduce overall cell size and, therefore, capital expenditure. In other embodiments the applied voltages can be used with cells initially operated in an anaerobic environment.

What is claimed is:

1. A bio-electrochemical system comprising:
   an aqueous chamber comprising a first anode and a first cathode and configured to dispose at least one electrogenic microbe;
   a gaseous chamber comprising a second cathode; and
   a hydrophobic barrier or a selectively permeable barrier separating the gaseous chamber from the aqueous chamber.

2. The bio-electrochemical system of claim 1, capable of producing water, hydrogen, methane, and electricity.

3. The bio-electrochemical system of claim 2, wherein the hydrogen is produced via an anaerobic reaction in the presence of an applied voltage.

4. The bio-electrochemical system of claim 2, wherein the methane is produced via the reduction of $CO_2$ in the presence of an applied voltage.

5. The bio-electrochemical system of claim 1, wherein the first anode and the first and second cathodes are electrically connected.

6. The bio-electrochemical system of claim 1, further comprising a second anode.

7. The bio-electrochemical system of claim 1, wherein the first anode is configured to receive the at least one electrogenic microbe.

8. The bio-electrochemical system of claim 1, wherein the first cathode is configured to receive the at least one electrogenic microbe.

9. The bio-electrochemical system of claim 1, further comprising a voltage source configured to apply a voltage to the first cathode.

10. The bio-electrochemical system of claim 1, further comprising a voltage source configured to apply a voltage to the second cathode.

11. The bio-electrochemical system of claim 1, wherein the first anode and the first and second cathodes are configured to rotate.

12. The bio-electrochemical system of claim 1, wherein the gaseous chamber is adjacent to the aqueous chamber.

13. The bio-electrochemical system of claim 1, wherein the gaseous chamber is arranged sequentially from the aqueous chamber.

14. The bio-electrochemical system of claim 1, wherein the first cathode is configured to be fully immersed in an aqueous electrolyte.

15. The bio-electrochemical system of claim 14, wherein the second cathode is fully within the gaseous chamber.

16. A bio-electrochemical system comprising:
   an aqueous chamber comprising a first and a second anode and at least one cathode, wherein the first anode is electrically coupled to the at least one cathode disposed in the aqueous chamber;
   a gaseous chamber separated from the aqueous chamber by a hydrophobic barrier or a selectively permeable barrier and comprising at least one cathode,
   wherein the second anode is electrically coupled to the at least one cathode disposed in the gaseous chamber; and
   at least one electrogenic microbe disposed in the aqueous chamber.

* * * * *